(12) United States Patent
Chan et al.

(10) Patent No.: US 12,013,703 B2
(45) Date of Patent: *Jun. 18, 2024

(54) SYSTEMS AND METHODS FOR EVALUATING AUTONOMOUS VEHICLE SOFTWARE INTERACTIONS FOR PROPOSED TRIPS

(71) Applicant: State Farm Mutual Automobile Insurance Company, Bloomington, IL (US)

(72) Inventors: Aaron Scott Chan, San Jose, CA (US); Steve Cielocha, Bloomington, IL (US); Brian Fields, Phoenix, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,150

(22) Filed: Apr. 20, 2023

(65) Prior Publication Data

US 2023/0251665 A1 Aug. 10, 2023

Related U.S. Application Data

(63) Continuation of application No. 17/334,218, filed on May 28, 2021, now Pat. No. 11,662,732, which is a
(Continued)

(51) Int. Cl.
*G05D 1/00* (2006.01)
*B60W 50/04* (2006.01)
(Continued)

(52) U.S. Cl.
CPC ......... *G05D 1/0214* (2013.01); *B60W 50/045* (2013.01); *G01C 21/3415* (2013.01);
(Continued)

(58) Field of Classification Search
CPC ............ G05D 1/0214; G05D 1/0285; G05D 2201/0213; G01C 21/3415; G07C 5/008;
(Continued)

(56) References Cited

U.S. PATENT DOCUMENTS 5,363,298 A 11/1994 Survanshi
6,799,101 B2 9/2004 Hawig
(Continued)

OTHER PUBLICATIONS

"Connected and Automated Vehicle Program Plan", Fall 2017, Virginia Department of Transportation, 47 pgs.
(Continued)

*Primary Examiner* — Muhammad Shafi
(74) *Attorney, Agent, or Firm* — Armstrong Teasdale LLP

(57) ABSTRACT

An autonomous vehicle (AV) computing device including at least one processor may be provided. The at least processor may be programmed to (i) receive a proposed trip including a destination location and a departure time, (ii) determine environmental conditions data based on the destination location and the departure time, (iii) retrieve current software ecosystem data for the AV, (iv) retrieve aggregated data for a plurality of AVs, the aggregated data including a plurality of correlations, each correlation including a) an interaction between at least one software application and at least one environmental condition and b) an adverse performance outcome associated with the interaction, (v) compare the environmental conditions data for the proposed trip and the current software ecosystem data for the AV to the plurality of correlations to identify an adverse performance outcome, and (vi) execute a remedial action to avoid the adverse performance outcome.

20 Claims, 8 Drawing Sheets

Related U.S. Application Data continuation of application No. 16/376,836, filed on Apr. 5, 2019, now Pat. No. 11,048,261.

(51) Int. Cl.
*G01C 21/34* (2006.01)
*G07C 5/00* (2006.01)

(52) U.S. Cl.
CPC ............ *G05D 1/0285* (2013.01); *G07C 5/008* (2013.01); *B60W 2050/046* (2013.01); *B60W 2555/20* (2020.02); *B60W 2556/50* (2020.02); *B60W 2556/65* (2020.02)

(58) Field of Classification Search
CPC ............ B60W 50/045; B60W 2556/65; B60W 2556/50; B60W 2555/20; B60W 2050/046
USPC ........................................................ 701/23
See application file for complete search history.

(56) References Cited

U.S. PATENT DOCUMENTS

| | | |
|---|---|---|
| 7,366,589 B2 | 4/2008 | Habermas |
| 8,332,242 B1 | 12/2012 | Medina, III |
| 8,392,764 B2 | 3/2013 | de Buen |
| 8,589,018 B2 | 11/2013 | Sarnacke |
| 8,781,669 B1 | 7/2014 | Teller |
| 8,788,134 B1 | 7/2014 | Litkouhi |
| 8,849,494 B1* | 9/2014 | Herbach .............. G05D 1/0297 701/24 |
| 8,914,184 B2 | 12/2014 | McQuade |
| 8,949,823 B2 | 2/2015 | Ricci |
| 9,036,026 B2 | 5/2015 | Dellantoni |
| 9,117,318 B2 | 8/2015 | Ricci |
| 9,176,500 B1 | 11/2015 | Teller |
| 9,218,698 B2 | 12/2015 | Ricci |
| 9,224,251 B2 | 12/2015 | Harata |
| 9,229,905 B1 | 1/2016 | Penilla |
| 9,229,906 B2 | 1/2016 | McQuade |
| 9,277,370 B2 | 3/2016 | Addepalli |
| 9,311,271 B2 | 4/2016 | Wright |
| 9,412,273 B2 | 8/2016 | Ricci |
| 9,464,905 B2 | 10/2016 | Lewis |
| 9,467,515 B1 | 10/2016 | Penilla |
| 9,493,130 B2 | 11/2016 | Penilla |
| 9,494,935 B2 | 11/2016 | Okumura |
| 9,507,346 B1 | 11/2016 | Levinson |
| 9,536,149 B1 | 1/2017 | Cesarano |
| 9,600,266 B2 | 3/2017 | Molin |
| 9,612,123 B1 | 4/2017 | Levinson |
| 9,633,487 B2 | 4/2017 | Wright |
| 9,646,428 B1 | 5/2017 | Konrardy |
| 9,715,711 B1 | 7/2017 | Konrardy |
| 9,720,410 B2 | 8/2017 | Fairfield |
| 9,754,325 B1 | 9/2017 | Konrardy |
| 9,767,516 B1 | 9/2017 | Konrardy |
| 9,792,656 B1 | 10/2017 | Konrardy |
| 9,805,423 B1 | 10/2017 | Konrardy |
| 9,811,086 B1 | 11/2017 | Poeppel |
| 9,816,827 B1 | 11/2017 | Slusar |
| 9,852,475 B1 | 12/2017 | Konrardy |
| 9,858,621 B1 | 1/2018 | Konrardy |
| 9,915,543 B2 | 3/2018 | Chintakindi |
| 9,932,033 B2 | 4/2018 | Slusar |
| 9,940,761 B2 | 4/2018 | Kundu |
| 9,946,531 B1 | 4/2018 | Fields |
| 9,947,224 B2 | 4/2018 | Fairfield |
| 9,963,106 B1 | 5/2018 | Ricci |
| 9,972,054 B1 | 5/2018 | Konrardy |
| 9,998,487 B2 | 6/2018 | Mestha |
| 10,012,993 B1 | 7/2018 | Matus |
| 10,026,130 B1 | 7/2018 | Konrardy |
| 10,089,693 B1 | 10/2018 | Konrardy |
| 10,181,161 B1 | 1/2019 | Konrardy |
| 10,185,997 B1 | 1/2019 | Konrardy |
| 10,185,998 B1 | 1/2019 | Konrardy |
| 10,185,999 B1 | 1/2019 | Konrardy |
| 10,192,369 B2 | 1/2019 | Wright |
| 10,198,879 B2 | 2/2019 | Wright |
| 10,223,479 B1 | 3/2019 | Konrardy |
| 10,319,039 B1 | 6/2019 | Konrardy |
| 10,354,330 B1 | 7/2019 | Konrardy |
| 10,373,259 B1 | 8/2019 | Konrardy |
| 10,459,444 B1 | 10/2019 | Kentley-Klay |
| 10,529,027 B1 | 1/2020 | Konrardy |
| 11,061,398 B2 | 7/2021 | Levinson |
| 11,062,396 B1 | 7/2021 | Konrardy |
| 2001/0048376 A1 | 12/2001 | Maeda |
| 2003/0139948 A1 | 7/2003 | Strech |
| 2005/0071202 A1 | 3/2005 | Kendrick |
| 2005/0097541 A1 | 5/2005 | Holland |
| 2009/0119657 A1 | 5/2009 | Link, II |
| 2010/0136944 A1 | 6/2010 | Taylor |
| 2010/0228427 A1 | 9/2010 | Anderson |
| 2011/0093846 A1 | 4/2011 | Moinzadeh |
| 2011/0197187 A1 | 8/2011 | Roh |
| 2011/0224898 A1 | 9/2011 | Scofield |
| 2011/0251734 A1 | 10/2011 | Schepp |
| 2011/0307336 A1 | 12/2011 | Smirnov |
| 2012/0209634 A1 | 8/2012 | Ling |
| 2012/0226413 A1 | 9/2012 | Chen |
| 2015/0061895 A1 | 3/2015 | Ricci |
| 2015/0088334 A1 | 3/2015 | Bowers |
| 2015/0088550 A1 | 3/2015 | Bowers |
| 2015/0112730 A1 | 4/2015 | Binion |
| 2015/0112731 A1 | 4/2015 | Binion |
| 2015/0178998 A1 | 6/2015 | Attard |
| 2015/0187019 A1 | 7/2015 | Fernandes |
| 2015/0193219 A1 | 7/2015 | Pandya |
| 2015/0220321 A1 | 8/2015 | Jung |
| 2015/0370251 A1* | 12/2015 | Siegel .................... B64C 39/024 701/2 |
| 2016/0170775 A1 | 6/2016 | Rockwell |
| 2016/0217627 A1 | 7/2016 | Khalaschi |
| 2017/0126810 A1 | 5/2017 | Kentley |
| 2017/0234689 A1 | 8/2017 | Gibson |
| 2017/0242688 A1 | 8/2017 | Yu |
| 2017/0293296 A1* | 10/2017 | Stenneth .............. G06Q 10/047 |
| 2018/0079424 A1 | 3/2018 | Myers |
| 2018/0126951 A1 | 5/2018 | Ricci |
| 2018/0127001 A1 | 5/2018 | Ricci |
| 2018/0130347 A1 | 5/2018 | Ricci |
| 2018/0164825 A1 | 6/2018 | Matus |
| 2018/0275665 A1* | 9/2018 | Chintakindi ......... G05D 1/0088 |
| 2018/0283895 A1* | 10/2018 | Aikin ................. G01C 21/3415 |
| 2018/0339712 A1 | 11/2018 | Kislovskiy |
| 2018/0341276 A1 | 11/2018 | Kislovskiy |
| 2019/0012551 A1 | 1/2019 | Fung |
| 2019/0049968 A1 | 2/2019 | Dean |
| 2019/0072965 A1 | 3/2019 | Zhang |
| 2019/0281483 A1 | 9/2019 | Chalmer |
| 2020/0257301 A1 | 8/2020 | Weiser |
| 2020/0279478 A1 | 9/2020 | Zhang |
| 2020/0309533 A1* | 10/2020 | Young .................. G06V 10/811 |
| 2021/0133871 A1 | 5/2021 | Konrardy |

OTHER PUBLICATIONS

"How to Get Started Developing for Automated Driving", Automated Driving, Dec. 13, 2016, 7 pgs.

"Renovo and EdgeConneX Announce Collaboration on Edge Data Infrastructure to Enable Automated Mobility Systems at Scale", Renovo Auto, Jun. 13, 2018, 6 pgs.

Geng et al., "A Scenario-Adaptive Driving Behavior Prediction Approach to Urban Autonomous Driving", Published Apr. 22, 2017, App. Sci. 2017, 7, 426; doi:10.3390/app7040426, 21 pages.

Matthew Seidl, "Data Analysis Report—Phase 1", Jan. 4, 2018, 54 pgs.

* cited by examiner

SYSTEMS AND METHODS FOR EVALUATING AUTONOMOUS VEHICLE SOFTWARE INTERACTIONS FOR PROPOSED TRIPS

CROSS-REFERENCE TO RELATED APPLICATIONS

This application is a continuation of, and claims the benefit of, U.S. patent application Ser. No. 17/334,218, filed May 28, 2021, now U.S. Pat. No. 11,662,732, and entitled "SYSTEMS AND METHODS FOR EVALUATING AUTONOMOUS VEHICLE SOFTWARE INTERACTIONS FOR PROPOSED TRIPS," which is a continuation of, and claims the benefit of, U.S. patent application Ser. No. 16/376,836, filed Apr. 5, 2019, now U.S. Pat. No. 11,048,261, and entitled "SYSTEMS AND METHODS FOR EVALUATING AUTONOMOUS VEHICLE SOFTWARE INTERACTIONS FOR PROPOSED TRIPS," the contents of which are hereby incorporated by reference, in their entirety and for all purposes, herein.

FIELD OF THE DISCLOSURE

The present disclosure relates to autonomous vehicles and, more particularly, to a system and method for evaluating data processed by an autonomous vehicle to identify potential performance outcomes based on interactions between software onboard the autonomous vehicle and environmental conditions experienced by the autonomous vehicle for a proposed trip.

BACKGROUND

An autonomous vehicle (AV), also known as a "self-driving car", is a vehicle that is capable of operating automatically without human input. AVs may operate at varying levels of autonomy, such as through a relatively low-level-autonomy system, sometimes referred to as an advanced driver-assistance system (ADAS) which is currently utilized in the automotive industry, or a high-level-autonomy system, sometimes referred to as an automatic-driving system (ADS) which is utilized in "self-driving" vehicles. While AV technology is advancing rapidly, developing a fully autonomous vehicle is an interdisciplinary challenge that requires further advancement in a number of related technologies.

AVs may have many different types of software onboard, including autonomous driving systems, operating systems, user-selected infotainment applications, firmware, etc. These software applications may generally be updated several times through updated software versions, patches, etc. Over time, certain versions and/or combinations of software may result in unintended or adverse outcomes, particularly under specific environmental conditions. For example, certain software applications and/or combinations of software applications may have interaction issues with hilly environments or during snowfall that result in adverse vehicle performance (e.g., collisions).

As AVs become more prevalent, minimizing risks associated with AVs become increasingly important. As discussed above, combinations of software within an AV "software ecosystem" (e.g., the entirety of software applications onboard the AV) may produce unexpected effects on AV performance, especially in certain environmental conditions. While these effects may be difficult to predict based on data from a single vehicle, data from a large number of AVs may facilitate enhanced analysis. Although at least some known systems may aggregate data from multiple AVs, none of these systems are able to evaluate risk based on interactions between AV software ecosystems and environmental conditions. Accordingly, there is a need for an AV system capable of evaluating risk of performance issues due to these software/condition interactions for a proposed trip of an AV based upon AV software-related data aggregated from a number of AVs.

BRIEF SUMMARY

The present embodiments may relate to systems and methods for evaluating potential performance outcomes and risks based on interactions between software onboard an autonomous vehicle and environmental conditions associated with a proposed trip of the autonomous vehicle, based on aggregated data from a plurality of autonomous vehicles.

In one aspect, an autonomous vehicle (AV) computing device onboard an AV and including at least one processor may be provided. The at least processor may be programmed to (i) receive a proposed trip for the AV including a destination location and a departure time, (ii) determine environmental conditions data for the proposed trip based on the destination location and the departure time, wherein the environmental conditions data includes environmental conditions likely to be experienced by the AV during the proposed trip, (iii) retrieve current software ecosystem data for the AV, wherein the current software ecosystem data includes software applications currently onboard the AV, (iv) retrieve, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) compare the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) execute a remedial action to avoid the identified adverse performance outcome.

In another aspect, a computer-implemented method may be provided. The computer-implemented method may include (i) receiving, by an autonomous vehicle (AV) computing device, a proposed trip for the AV including a destination location and a departure time, (ii) determining, by the AV computing device, environmental conditions data for the proposed trip based on the destination location and the departure time, wherein the environmental conditions data includes environmental conditions likely to be experienced by the AV during the proposed trip, (iii) retrieving, by the AV computing device, current software ecosystem data for the AV, wherein the current software ecosystem data includes software applications currently onboard the AV, (iv) retrieving, by the AV computing device, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) comparing, by the AV computing device, the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) executing, by the AV computing device, a remedial action to avoid the identified adverse performance outcome.

In a further aspect, at least one non-transitory computer-readable media having computer-executable instructions thereon may be provided. When the instructions are executed by at least one processor of an autonomous vehicle (AV) computing device onboard an AV, the instructions may cause the at least one processor of the AV computing device to (i) receive a proposed trip for the AV including a destination location and a departure time, (ii) determine environmental conditions data for the proposed trip based on the destination location and the departure time, wherein the environmental conditions data includes environmental conditions likely to be experienced by the AV during the proposed trip, (iii) retrieve current software ecosystem data for the AV, wherein the current software ecosystem data includes software applications currently onboard the AV, (iv) retrieve, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) compare the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) execute a remedial action to avoid the identified adverse performance outcome.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
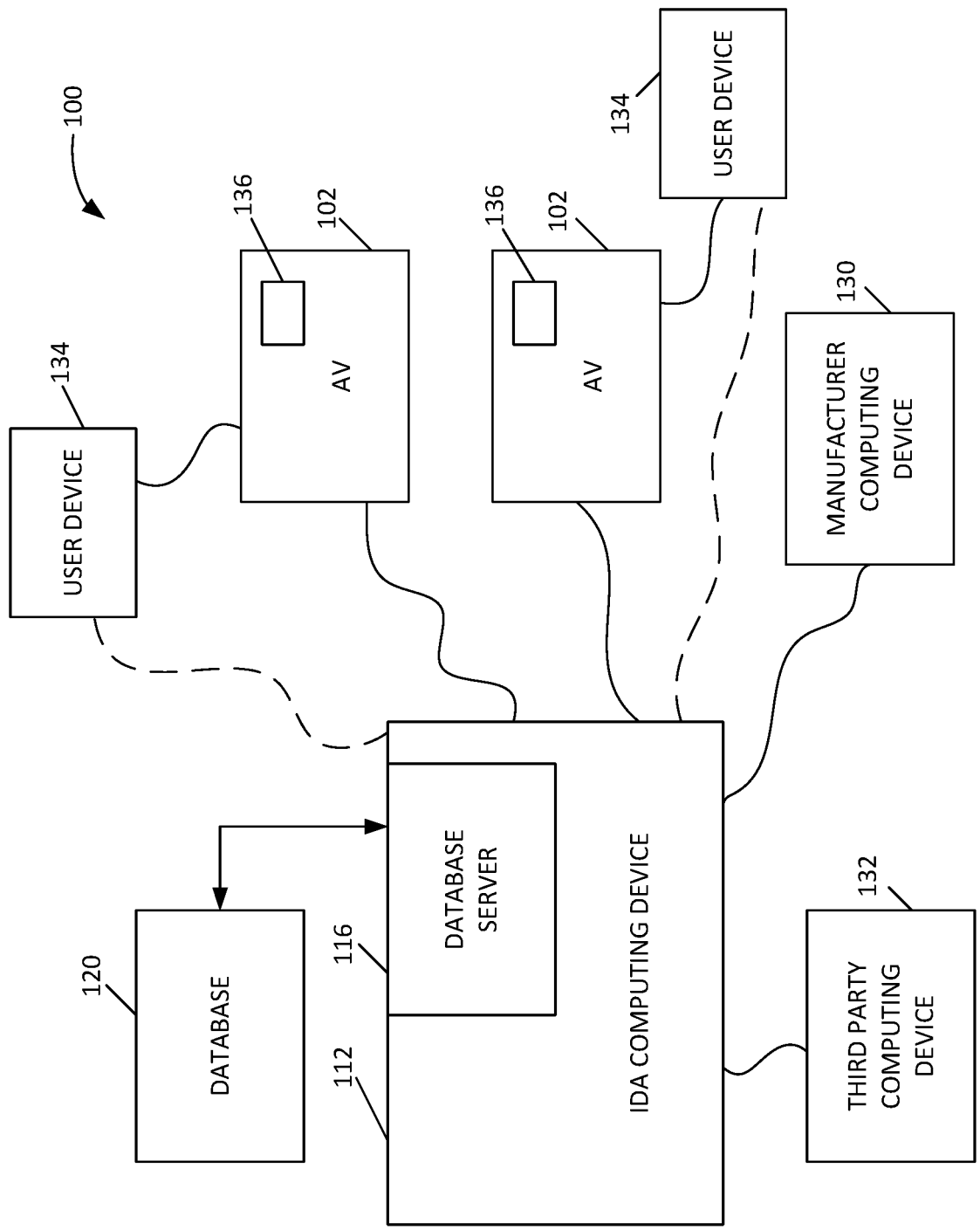
FIG. 1 depicts an exemplary interaction detection system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for evaluating potential performance outcomes and risks based on interactions between software onboard an autonomous vehicles and environmental conditions associated with a proposed trip of the autonomous vehicle, based on aggregated data from a plurality of autonomous vehicles.

In one exemplary embodiment, the process may be performed by an autonomous vehicle (AV) having an AV computing device in communication with an interaction detection and analysis (IDA) computing device that serves as a central data aggregation and analysis platform.

As described below, the systems and methods described herein evaluate potential performance outcomes and risks based on interactions between software ecosystems onboard an AV and environmental conditions associated with a proposed trip of the AV that may result in potential performance outcomes. This enables assessing and segmenting risk for the AV based upon its software ecosystem and for individual trips. Further, the data maintained by the IDA computing device may have independent value to dealer service centers, automobile manufacturers, regulatory authority, etc., at least because the data may assist in identifying groups of vehicles or individual vehicles that should have maintenance performed on their onboard software. This may enable parties to identify potential performance issues relatively early, before adverse outcomes become prevalent, and enhance the ability to assess the risks of interactions between software ecosystems and environmental conditions for future trips (e.g., future uses of the AV).

Software Ecosystems Onboard Autonomous Vehicles

An autonomous vehicle (AV) is a vehicle capable of operating, in some capacity, without human input. AVs may operate at varying levels of autonomy. For example, AV systems may be classified based upon the level of autonomy of which they are capable. The classification system developed by SAE International, for example, classifies AV systems from Level 0 to Level 5, where Level 0 represents a low level of autonomy, and Level 5 represents a fully autonomous vehicle. Further, AV operation systems may be categorized generally into two categories based upon the level of autonomy. Systems with low-level autonomy, such as advanced-driver assistance systems (ADAS), are systems which allow the AV to assist the driver in a certain driving operation. For example, an AV operation feature which assists a driver in parallel parking may be classified as an ADAS. Alternatively, systems with high-level autonomy, such as automatic-driving systems (ADS), allow for completely autonomous control of certain aspects of driving. For example, an AV feature which allows a driver to take full attention off the road while the AV drives to a set destination may be classified as an ADS. As used herein, autonomous vehicle (AV) refers to an AV (either having low-level-autonomy, high-level-autonomy, or something in between) and/or any components or elements which make up an AV, such as an AV operating system, navigation system, central processor, sensors, and other systems which may be components of an AV.

AVs may have many different types of software onboard. For example, software applications installed onboard an AV may include autonomous driving systems, operating systems, user-selected infotainment applications, firmware, etc. These software applications may be updated several times through updated software versions, patches, etc. The entirety of software applications onboard a particular AV may be referred to herein as the "software ecosystem" for that AV. Because different AVs may have different software applications and/or different versions of the same software applications, software ecosystems may vary greatly from AV to AV.

Over time, certain versions and/or combinations of software in a particular software ecosystem may result in unintended or adverse outcomes, particularly under specific environmental conditions. For example, certain software applications and/or combinations of software applications may have interaction issues with hilly environments or during snowfall. As used herein, "environmental conditions" may refer to any external condition experienced by an AV. For example, environmental conditions may include weather conditions experienced by the AV, terrain traversed by the AV (e.g., hilly terrain, flat terrain, pavement, dirt roads, etc.), and other vehicles encountered by the AV.

Data Aggregation Using the Ida Computing Device

To detect interactions between AV software ecosystems and environmental conditions, the IDA computing device may aggregate data for a plurality of different AVs from a plurality of different data sources. Specifically, the IDA computing device may function as a centralized data repository platform that aggregates the data.

Because software ecosystems may vary greatly from AV to AV, aggregating data for a large number of AVs (as opposed to only a limited number of AVs) improves the IDA computing device's ability to effectively detect meaningful interactions and patterns in the aggregated data. In the systems and methods described herein, the IDA computing device may receive, for each of a plurality of AVs, software ecosystem data, environmental conditions data, and performance data, as described in detail below.

As used herein, "software ecosystem data" may refer to any data identifying the current software ecosystem for an AV. For example, software ecosystem data for a particular AV may include all software applications currently installed on the AV, as well as the current version of each software application. Further, software ecosystem data for the particular AV may include an update history for the software applications that indicates when each software application was updated. In some embodiments, the AV may include automatic update functionality that, when activated, causes software applications onboard the AV to be automatically updated whenever newer versions and/or patches become available. In such embodiments, the software ecosystem data may also indicate whether the particular AV has automatic update functionality, and whether the automatic update functionality is currently activated. The software ecosystem data may also include additional data related to the software ecosystems of the plurality of AVs.

"Environmental conditions data", as used herein, may refer to any data identifying environmental conditions experienced by the plurality of AVs. For example, for a particular AV, environmental conditions data may include weather conditions experienced by the AV and terrain traversed by the AV. In some embodiments, a computing device onboard the AV or separate from the AV may determine the weather conditions and/or terrain from a location of the AV. For example, the computing device may perform a look-up using a location of the AV at a given time to determine the weather and/or terrain at that location at the given time. The location of the AV may be determined, for example, using a global positioning system (GPS) onboard the AV.

Environmental conditions data may also include other vehicles encountered by the AV. For example, in some embodiments, the AV may come within physical proximity of an additional AV. While the AV and the additional AV are within physical proximity of each other, the AV and the additional AV may exchange data (e.g., over a suitable wireless communications channel) to coordinate interactions between the two AVs. For example, the AV and the additional AV may exchange data to coordinate which AV has the right of way at an intersection. Accordingly, the environmental conditions data may include a record of other vehicles encountered by the AV and a summary of any interaction between the AV and the other vehicles during those encounters. The environmental conditions data may also include additional data related to the environmental conditions experienced by the plurality of AVs.

As used herein, "performance data" may refer to any data identifying performance of the plurality of AVs. For example, performance data for a particular AV may include a recorded speed and/or orientation of the AV over a predetermined period of time. Performance data may also include incidents (e.g., collisions, running a red light, failure to stop within a certain distance, lane crossings, abrupt steering inputs, hard braking, automatic braking engaged, a number of manual overrides by a user, etc.) which the AV has been involved in. The performance data may also include additional data related to the performance of the plurality of AVs. The performance data may be generated, for example, using an insurance telematics device installed onboard the AV.

In some embodiments, IDA computing device may receive and store other types of data in data records. For example, in some embodiments, IDA computing device may receive and store maintenance logs for hardware sensors onboard AVs.

The software ecosystem data, environmental conditions data, and performance data may be received from a plurality of different data sources. For example, in some embodiments, the IDA computing device may receive at least some of the software ecosystem data, environmental conditions data, and performance data directly from the AVs themselves (e.g., over a suitable wired and/or wireless network). Further, in some embodiments, the IDA computing device may receive at least some of the software ecosystem data, environmental conditions data, and performance data directly from one or more manufacturers of the AVs. For example, a manufacturer computing device associated with a manufacturer may receive software ecosystem data, environmental conditions data, and/or performance data from a fleet of AVs produced by that manufacturer. The data collected by the manufacturer computing device may then be transmitted (e.g., periodically) to the IDA computing device (e.g., over a suitable wired and/or wireless network).

In addition, in some embodiments, the IDA computing device may receive at least some of the software ecosystem data, environmental conditions data, and performance data directly from a third party computing device. For example, a mechanic servicing an AV may input software ecosystem data, environmental conditions data, and/or performance data into a third party computing device, causing the data to be transmitted to the IDA computing device (e.g., via a web portal accessed by the mechanic using the third party computing device). An insurance company computing device associated with an insurance company is another example of a third party computing device that may be used to transmit data to the IDA computing device.

Data Storage Using the Ida Computing Device

The IDA computing device may store the received software ecosystem data, environmental conditions data, and performance data for the plurality of AVs in a database associated with or included in the IDA computing device. Specifically, the IDA computing device may create a separate data record for each of the plurality of AVs in the database. Further, the IDA computing device may store any software ecosystem data, environmental conditions data, and performance data for a particular AV in the data record associated with that AV. The data records may be indexed using any suitable identifier associated with the AVs. For example, in some embodiments, the data records may be indexed by vehicle identification numbers (VINs) associated with each AV. Alternatively, the data records may be indexed by other identifiers, including identifiers that do not include individually-identifiable information for a particular AV.

Once a data record is established for a particular AV, the data record may be automatically updated whenever additional software ecosystem data, environmental conditions data, and/or performance data for the AV is received at the IDA computing device. The data record may be updated in real-time (e.g., upon receipt of the additional data), or may be updated periodically. For example, to conserve computational resources, data records may be updated by the IDA computing device at prescheduled times such that different data records are scheduled to be updated at different times. This may reduce the computational resources required to update the data records, particular when large amounts of additional software ecosystem data, environmental conditions data, and/or performance data are received at the IDA computing device at once (e.g., from a manufacturer computing device). In some embodiments, each data record includes a time stamp that indicates when that data record was most recently updated.

In some embodiments, in addition to the most recently received data for an AV, the data records maintain previously stored data. Accordingly, each data record includes historical data (e.g., previous software ecosystems and a time stamps indicating when the each previous software ecosystem was present on the AV) that provides a comprehensive record for the associated AV. Further, the historical data may be analyzed by the IDA computing device. For example, from the historical data, the IDA computing device may determine whether particular software applications on AVs are generally updated promptly once an update is available, or whether those software applications are generally updated a substantial period of time after an update is available.

Detecting Interactions and Correlations Using the Ida Computing Device

To identify interactions between software ecosystems and environmental conditions, the IDA computing device may use one or more algorithms (e.g., clustering algorithms, machine learning algorithms) to analyze the data stored in the data records for the plurality of AVs.

For example, in some embodiments, the IDA computing device applies one or more clustering algorithms to identify a subset of data records for AVs that have similar software ecosystems. Because a given software ecosystem may include multiple software applications, with each application having a current version, it may be unlikely that multiple AVs will have identical software ecosystems. However, when data is collected for a relatively large number of AVs, it may be likely that at least some of the AVs will have similar software ecosystems. Alternatively or additionally, to facilitate detecting interactions and correlations as described below, the IDA computing device may apply one or more clustering algorithms to identify a subset of data records for AVs that have similar performance data.

In some embodiments, one or more clustering algorithms may estimate or ascertain similar software ecosystems based on the function of a given software program. That is, the algorithm may assign clusters based on identifying similar input and output data for a given software program even though the developers, versions, and/or names of the given software program may be different. For example, suppose that there are numerous GPS navigation systems, and that Vehicle A has navigation program Zeta version 8.3 which is generally rare. The clustering algorithm may aggregate data for vehicles with Zeta version 8.3 and may also cluster Vehicle A with other vehicles that have non-Zeta navigation programs that function in a similar manner to Zeta (for example, Zeta and other navigation programs that give turn-by-turn directions only using landmarks).

Further, in some embodiments, the clustering algorithms may identify similar software programs by determining that the one or more software programs call data from the same external API. Although the software programs may function differently, clustering algorithms may cluster the software programs as similar because the software programs use the same data to derive proprietary calculations. Additionally or alternatively, the clustering algorithms may identify similar software programs based on metadata associated with the given software programs. For example, downloaded software programs (e.g., applications from an app store) may contain classifications about the function and/or categories of the software programs (e.g., food ordering, safety, car-sharing programs, video streaming, etc.).

Because the data records may be updated relatively often, in some embodiments the IDA computing device may repeatedly apply the one or more clustering algorithms to identify similar data records based upon current data. For example, the IDA computing device may periodically apply the one or more clustering algorithms at a predetermined frequency to identify similar data records.

After the clustering algorithm identifies data records for AVs that have similar software ecosystems, the IDA computing device may analyze data records in the subset (e.g., using one or more machine learning algorithms) to attempt to identify patterns between software ecosystem data, environmental conditions data, and performance data stored therein. Specifically, from the software ecosystem data in the subset of data records, the IDA computing device may detect interactions between a particular software application or combination of software applications, and environmental conditions that may result in certain outcomes (including undesirable or adverse outcomes). That is, the IDA computing device is configured to detect correlations between software-environment interactions and outcomes. For example, the IDA computing device may determine that a number of AVs having Version 2.1 of Application X were involved in collisions when traversing steep terrain. Each correlation detected by the IDA computing device may be stored in the database for further analysis, as described below. Further, each correlation may be stored in the database in association with the data records that were used to detect the correlation.

In some embodiments, the clustering algorithms may not perform classifications or clustering of software ecosystems before analysis, and the clustering algorithms may instead assign classifications or clusters based on performance data. For example, the clustering algorithms may first identify and cluster the most similar performance data from the plurality of AVs and then cluster and analyze the clusters of similar performance data for similarities in the software ecosystems. This method may be used alone or in combination with the methods described above. In some embodiments, multiple clustering models may be combined to achieve an accurate outcome.

The IDA computing device may also generate a confidence indicator that indicates a strength of the detected correlation between the particular software-environment interaction and the particular outcome. The confidence indicator may generally represent the likelihood that a particular software-environment interaction actually contributes to the particular outcome. The confidence indicator may be, for example, a percentage or a textual description (e.g., unlikely, somewhat likely, very likely). Continuing the above example, if a large number of AVs that do not have Version 2.1 of Application X were also involved in collisions on steep terrain, the IDA computing device may generate a confidence indicator of 25% or "unlikely" in regards to whether an interaction between Version 2.1 of Application X and steep terrain contributes to collisions. In contrast, if substantially only AVs that have Version 2.1 of Application X were involved in collisions on steep terrain, the IDA computing device may generate a confidence indicator of 75% or "likely" in regards to whether an interaction between Version 2.1 of Application X and steep terrain contributes to collisions.

The IDA computing device may also automatically generate and transmit alert messages based on the detected correlations. For example, if the confidence indicator for a correlation exceeds a predetermined threshold (e.g., a predetermined percentage), the IDA computing device may automatically generate an alert message. The alert message may include text (e.g., "Warning: Using Version 2.1 of Application X on steep terrain may result in collisions"), or may include any suitable content. In some embodiments, the alert message may also suggest a remedial action (e.g., "Please update to Version 3.0 of Application X").

In some embodiments, the IDA computing device may transmit the generated alert message to one or more manufacturer computing devices. Further, in some embodiments, the IDA computing device may transmit the generated alert message to AVs that are at risk. For example, the IDA computing device may filter the data records stored in the database to identify all data records associated with AVs currently running Version 2.1 of Application X, and transmit the alert message directly to those AVs to notify the operators of those AVs. In embodiments where alert messages are transmitted directly to AVs, an alert message may also include a patch that causes the AV receiving the alert message to automatically update the onboard software ecosystem (e.g., by updating one or more software applications) to avoid undesirable outcomes.

Calculating Risk Scores Using the Ida Computing Device

In some embodiments, the IDA computing device may also calculate a risk score and/or identify conflicting softwares for a candidate AV based on the software ecosystem data, environmental conditions data, and performance data stored in the database. Specifically, the IDA computing device may receive candidate AV data that includes the software ecosystem for the candidate AV. The candidate AV data may be received, for example, directly from the candidate AV or from an insurance company computing device associated with an insurance company seeking a risk assessment for the candidate AV. The IDA computing device may compare the software ecosystem for the candidate AV to the data records stored in the database to retrieve data records that include software ecosystems that are relatively similar to the software ecosystem for the candidate AV.

The IDA computing device may then analyze the retrieved data records to identify any previously detected correlations that are stored in association with those data records. Further, the IDA computing device may calculate the risk score for the candidate AV based on any identified correlations. For example, if no associated correlations are identified for the retrieved data records, the IDA computing device may calculate a risk score that indicates the candidate AV has a low risk of experiencing an undesirable or adverse outcome. In contrast, if a number of correlations are identified for the retrieved data records and/or correlations associated with certain outcomes (e.g., collisions) are identified for the retrieved data records, the IDA computing device may calculate a risk score that indicates the candidate AV has a high risk of experiencing an undesirable or adverse outcome. The risk score may be transmitted, for example, to the computing device from which the candidate AV data was received. The risk score may be used by the insurance company computing device or the insurance company associated with the insurance company computing device to adjust an insurance rate associated with the candidate AV. For example, if the risk score indicates a high risk of the candidate AV experiencing an undesirable, adverse, or catastrophic outcome, the insurance rate associated with the candidate AV may be increased.

Receiving a Proposed Trip Using the Av Computing Device

The AV computing device may evaluate the interactions between a software ecosystem for a particular AV and environmental conditions that will likely be encountered by the AV during a proposed trip having a designated destination location and departure time. The AV computing device may receive a destination location and departure time to determine potential environmental conditions that correspond to one or more routes to the destination location.

To identify the destination location and departure time of a proposed trip, the AV computing device may receive input directly from the user (e.g., by entering an address on a touchscreen). Alternatively, the AV computing device may predict potential destination locations and departure times, for example, by analyzing data associated with the user.

To predict a potential destination location and departure time, the AV computing device may analyze user data. The AV computing device may obtain user data from, for example, an electronic calendar, emails, saved internet searches, purchase transaction data, and/or internet browsing data associated with the user. Such user data may be obtained by the AV computing device from data stored on the AV (e.g., data stored by software applications installed on the AV). Alternatively, the AV computing device may obtain user data by receiving data from a user computing device (e.g., a mobile phone device or PDA), or the Internet. The AV computing device may then compare the user data to data known to correspond with a particular potential destination location, to determine the likelihood that the user is planning a trip to the potential destination location at the potential departure time (e.g., 50% of users with similar user data travel to destination X at time Y). If the determined likelihood is sufficiently high (e.g., above a predefined threshold percentage), the AV computing device may automatically evaluate interactions between the software ecosystems onboard the AV and potential environmental conditions with respect to a proposed trip to the predicted destination location at the predicted departure time.

Determining Environmental Conditions Data for the Proposed Trip Using the Av Computing Device The AV computing device may determine potential environmental conditions data specific for a proposed trip to the identified destination location at the identified departure time. The AV computing device may obtain information about potential environmental conditions from, for example, the Internet. The environmental conditions data may correspond to a particular route and the departure time (e.g., day or night, a season, weather-related data, a specific date and time, etc.). The AV computing device may select the route based in part on the potential environmental conditions that are associated with different potential routes. These potential environmental conditions may include, for example, current and forecasted weather conditions along the route, terrain along the route, construction along the route, and events along the route that may cause an increase in traffic (e.g., a sporting event, concert, or festival). The potential environmental conditions may further include local events (e.g., road closures due to a parade), local regulations (e.g., speed limits), and compliance trends associated with the local regulations (e.g., a tendency for pedestrians to jaywalk in a certain location or during a certain event). Once a particular route to the identified destination location is selected, potential environmental conditions data associated with the particular selected route at the departure time (e.g., current or forecasted weather, traffic, construction, or events along the selected route) is considered when evaluating interactions between the AV's software ecosystem and environmental conditions.

Retrieving Current Software Ecosystem Data Using the Av Computing Device

The AV computing device may retrieve current software ecosystem data including software applications currently onboard the AV. For example, software ecosystem data for a particular AV may include all software applications currently installed on the AV, as well as the current version of each software application. Further, software ecosystem data for the particular AV may include an update history for the software applications that indicates when each software application was updated. In some embodiments, the AV may include automatic update functionality that, when activated, causes software applications onboard the AV to be automatically updated whenever newer versions and/or patches become available. In such embodiments, the software ecosystem data may also indicate whether the particular AV has automatic update functionality, and whether the automatic update functionality is currently activated.

Retrieving Aggregated Data Using the Av Computing Device

The AV computing device may retrieve aggregated data related to a plurality of AV's software ecosystem and environmental conditions. Such data may include, for example, software ecosystem data, environmental conditions data, and performance data from a plurality of AVs. The generation of aggregated data may be performed by the IDA computing device (described above) in communication with the AV computing device. The aggregated data may further include a plurality of correlations. Each correlation may include i) an interaction between at least one software application and at least one environmental condition and ii) an adverse performance outcome associated with the interaction. The adverse performance outcome may be deemed likely to occur for an AV with the associated interaction (e.g., a percentage of AVs with a particular interaction having an adverse performance outcome is above a threshold percentage) to warrant remedial action.

In some embodiments, the AV computing device retrieves data records stored in a database by the IDA computing device. The data records may include, for example, aggregated software ecosystem data, environmental conditions data, and performance data. The AV computing device may compare the software ecosystem for the AV to data records stored in the database to retrieve data records that include software ecosystems data that are relatively similar to the software ecosystem for the AV. The AV computing device may then receive the retrieved data records stored in the database by the IDA computing device.

Comparing Av Data to Aggregated Av Data to Identify Adverse Performance Outcomes Associated with the Av Data The AV computing device may compare the software ecosystem data for the AV and the environmental conditions data likely to be experienced by the AV to the plurality of correlations included in the aggregated data. The AV computing device may identify an adverse performance outcome associated with an interaction between a software application and/or combination of software applications currently onboard the AV and an environmental condition likely to be experienced by the AV on the proposed trip. For example, the AV computing device may determine that an interaction for the AV is sufficiently similar to an interaction corresponding to a correlation from the aggregated data to determine that the corresponding adverse performance outcome is likely to occur.

The AV computing device may calculate a risk score for the AV for the proposed trip based on any identified correlations. For example, if no associated correlations are identified for the retrieved data records, the AV computing device may calculate a risk score that indicates the AV has a low risk of experiencing an undesirable or adverse outcome on the proposed trip. In contrast, if a number of correlations are identified for the retrieved data records and/or correlations associated with certain outcomes (e.g., collisions) are identified for the retrieved data records, the AV computing device may calculate a risk score that indicates the AV has a high risk of experiencing an undesirable or adverse outcome on the proposed trip. In some example embodiments, the risk score may be transmitted to an insurance company computing device. The risk score may be used by the insurance company computing device or the insurance company associated with the insurance company computing device to adjust an insurance rate for associated with the candidate AV individualized for the proposed trip (e.g., the insurance company is insuring the AV specifically for the proposed trip at a rate specific to the proposed trip). For example, if the risk score indicates a high risk of the candidate AV experiencing an undesirable, adverse, or catastrophic outcome for the proposed trip, the individualized insurance rate associated with the candidate AV for the proposed trip may be increased.

In some alternative embodiments, the IDA computing device compares the software ecosystem data for the AV and the environmental conditions data likely to be experienced by the AV to the plurality of correlations included in the aggregated data. Further, the IDA computing device may calculate the risk score for the AV for the proposed trip based on any identified correlations. For example, if no associated correlations are identified for the retrieved data records, the IDA computing device may calculate a risk score that indicates the AV has a low risk of experiencing an undesirable or adverse outcome on the proposed trip. In contrast, if a number of correlations are identified for the retrieved data records and/or correlations associated with certain outcomes (e.g., collisions) are identified for the retrieved data records, the IDA computing device may calculate a risk score that indicates the AV has a high risk of experiencing an undesirable or adverse outcome on the proposed trip. The risk score is then transmitted to the AV computing device by the IDA computing device.

Executing a Remedial Action Using the Av Computing Device

In some embodiments, in response to the comparison of interactions or a received risk score, the AV computing device may execute remedial action to avoid identified adverse performance outcomes. The AV computing device may recommend remedies or remedial steps to the user or automatically implements such remedies for the AV.

For example, the AV computing device may display alert messages to the user based on the comparison or risk score. For example, if the risk score for an interaction exceeds a predetermined threshold of acceptable risk, the AV computing device may display an alert message. The alert message may include text (e.g., "Warning: Using Version 2.1 of Application X on steep terrain may result in collisions"), or may include any suitable content. Based on the risk score, the AV computing device may suggest a remedial action (e.g., "Please update to Version 3.0 of Application X").

In some embodiments, the AV computing device may automatically update the onboard software ecosystem (e.g., by updating one or more software applications) to avoid adverse performance outcomes. The AV computing device may download a patch that causes the AV to automatically update the onboard software ecosystem to minimize the number of interactions correlated with adverse performance outcomes (e.g., automatically updating Application X to Version 3.0 if currently installed Version 2.1 is correlated with adverse outcomes for the proposed trip).

Regulatory Applications of Detected Interactions and Correlations

In some embodiments, the detected correlations may be used by a regulatory authority (e.g., a motor vehicle registration entity) to establish registration requirements. For example, when a vehicle owner applies for registration of a candidate AV, they may submit candidate AV data (including the software ecosystem for the candidate AV) to the regulatory authority. The motor vehicle registration entity may then determine whether or not to approve the registration based at least in part on the software ecosystem of the vehicle.

For example, in one embodiment, a motor vehicle registration computing device associated with the motor vehicle registration entity may transmit the candidate AV data to the IDA computing device. In response, the IDA computing device may calculate a risk score (as described above) and transmit the risk score to the motor vehicle registration computing device. The motor vehicle registration entity (e.g., using the motor vehicle registration computing device) may compare the received risk score with a predetermined risk score threshold, and may approve registration if the received risk score is less than the predetermined risk score threshold. Alternatively, if the received risk score is greater than or equal to the predetermined risk score threshold, the motor vehicle registration entity may deny registration.

In another example, based on the correlations detected by the IDA computing device, the motor vehicle registration entity may establish a blacklist of certain software applications or combinations of software applications that, if present in the software ecosystem in the candidate AV data, should result in denial of registration for the candidate AV. For example, assume Version 2.1 of Application X has been identified by the IDA computing device as interacting with environmental conditions to result in undesirable or adverse outcomes. If the candidate AV data indicates that the candidate AV includes Version 2.1 of Application X, the motor vehicle registration entity may deny registration of the candidate AV based on a comparison of the candidate AV data to the blacklist. Further, the motor vehicle registration entity may inform the vehicle owner what steps need to be taken to result in approval of the registration (e.g., updating Application X to Version 3.0).

Although the above description discusses detecting interactions that result in undesirable or adverse outcomes, those of skill in the art will appreciate that IDA computing device may also be used to detect interactions that result in desirable outcomes (e.g., improved AV performance).

At least one of the technical problems addressed by this system may include: (i) improving the safety of AVs by proactively identifying interactions that may result in undesirable or adverse outcomes on a proposed trip; (ii) assessing and segmenting risk for AVs based on their software ecosystems with respect to a proposed trip; (iii) identifying groups of vehicles or individual vehicles that should have maintenance performed on their onboard software to reduce undesirable or adverse outcomes; (iv) reducing computational resources required to update data records in a large centralized database; (v) performing a risk assessment for a candidate AV to improve the safety of the candidate AV with respect to a proposed trip; and (vi) assisting in registration of a candidate AV by a regulatory authority to improve the safety of the candidate AV.

The methods and systems described herein may be implemented using computer programming or engineering techniques including computer software, firmware, hardware, or any combination or subset thereof, wherein the technical effects may be achieved by performing at least one of the following steps: (i) identifying a destination associated with the proposed trip; (ii) determining potential environmental conditions data for the AV based on the identified destination; (iii) determining software ecosystem data associated with the software onboard the AV; (iv) retrieving aggregated environmental conditions data, aggregated software ecosystem data, and aggregated performance data for a plurality of AVs from a server system; and (v) comparing the potential environmental conditions data and software ecosystem data for the AV to the aggregated environmental conditions data, aggregated software ecosystem data, and aggregated performance data to identify correlations associated with the proposed trip.

Exemplary System for Detecting Interactions

FIG. 1 depicts an exemplary interaction detection system 100 in accordance with an exemplary embodiment of the present disclosure. In the exemplary embodiment, interaction detection system 100 may include a plurality of autonomous vehicles ("AVs") 102 and an interaction detection and analysis ("IDA") computing device 112. IDA computing device 112 may be communicatively coupled to AVs 102.

A database server 116 of IDA computing device 112 may be connected to a database 120, which contains information on a variety of matters, as described below in greater detail. In the exemplary embodiment, database 120 may be a non-centralized database stored remotely from IDA computing device 112.

IDA computing device 112 may also be communicatively coupled to a manufacturer computing device 130, a third party computing device 132, and at least one user device 134. In one embodiment, at least one of AVs 102, manufacturer computing device 130, third party computing device 132, and user device 134 may be computers including a web browser, such that IDA computing device 112 is accessible to at least one of AVs 102, manufacturer computing device 130, third party computing device 132, and user device 134 using the Internet. AVs 102, manufacturer computing device 130, third party computing device 132, and user device 134 may be interconnected to the Internet through many interfaces including a network, such as a local area network (LAN) or a wide area network (WAN), dial-in-connections, cable modems, and special high-speed Integrated Services Digital Network (ISDN) lines. AVs 102, manufacturer computing device 130, third party computing device 132, and user device 134 may be any device capable of interconnecting to the Internet including a web-based phone, PDA, or other web-based connectable equipment.

To detect and analyze interactions between AV software ecosystems and environmental conditions, IDA computing device 112 may aggregate data for a plurality of different AVs 102 from a plurality of different data sources (e.g., AVs 102, manufacturer computing device 130, third party computing device 132, and user device 134). Specifically, IDA computing device 112 may function as a centralized data repository platform that aggregates the data from the plurality of different data sources.

Because software ecosystems may vary greatly from AV 102 to AV 102, aggregating data for a large number of AVs 102 (as opposed to only a limited number of AVs) 102 improves IDA computing device's ability to effectively detect meaningful interactions and patterns in the aggregated data. In the systems and methods described herein, IDA computing device 112 may receive, for each of a plurality of AVs 102, software ecosystem data, environmental conditions data, and performance data. In some embodiments, IDA computing device 112 may also receive and store other types of data. For example, in some embodiments, IDA computing device 112 may receive and store maintenance logs for hardware sensors onboard AVs 102.

The software ecosystem data, environmental conditions data, and performance data may be received from a plurality of different data sources. For example, in some embodiments, IDA computing device 112 may receive at least some of the software ecosystem data, environmental conditions data, and performance data directly from the AVs 102 themselves (e.g., over a suitable wired and/or wireless network). At least some of the software ecosystem data, environmental conditions data, and performance data may be collected using one or more sensors 136 onboard AVs 102. For example, environmental conditions data may be collected using temperature sensors, terrain sensors, etc. Further, in some embodiments, IDA computing device 112 may receive at least some of the software ecosystem data, environmental conditions data, and performance data directly from one or more manufacturers of the AVs. For example, manufacturer computing device 130 associated with a manufacturer may receive software ecosystem data, environmental conditions data, and/or performance data from a fleet of AVs 102 produced by that manufacturer. The data collected by manufacturer computing device 130 may then be transmitted (e.g., periodically) to IDA computing device 112 (e.g., over a suitable wired and/or wireless network).

In addition, in some embodiments, at least some of the software ecosystem data, environmental conditions data, and performance data may be received by the IDA computing device 112 directly from third party computing device 132. For example, a mechanic or other entity servicing an AV 102 may input software ecosystem data, environmental conditions data, and/or performance data into third party computing device 132 (e.g., via a web portal accessed using third party computing device 132), causing the data to be transmitted to IDA computing device 112. An insurance company computing device associated with an insurance company is another example of third party computing device 132 that may be used to transmit data to IDA computing device 112.

In some embodiments, IDA computing device 112 may also receive data from one or more user devices 134 associated with AV 102. For example, a driver or passenger in AV 102 may have user device 134 while operating or riding in AV 102. User device 134 may be linked to IDA computing device 112 via an application running on user device 134. In another example, the user device may connect to AV 102 (e.g., via Bluetooth) to enable IDA computing device 112 to receive data from the user device via AV 102. User device 134 may automatically collect data using one or more sensors on user device 134. For example, in one embodiment, an accelerometer and/or gyroscope on user device 134 may collect performance data (e.g., indicative of a collision, sudden braking, etc.). Similar to a mechanic operating third part computing device 132, the user may also manually input software ecosystem data, environmental conditions data, and/or performance data into user device 134. This data to may be subsequently transmitted to IDA computing device 112 (e.g., via a web portal accessed by the user using user device 134).

In exemplary embodiments, IDA computing device 112 may store the received data (e.g., the software ecosystem data, environmental conditions data, and performance data) for the plurality of AVs in database 120 coupled to IDA computing device 112. Specifically, IDA computing device 112 may create a separate data record for each of the plurality of AVs 102 in database 120. Further, IDA computing device 112 may store any software ecosystem data, environmental conditions data, and performance data for a particular AV 102 in the data record associated with that AV 102. The data records may be indexed using any suitable identifier associated with the AVs 102. The data in the data records may be constantly updated in real-time or semi-real-time.

Once a data record is established, the data record for a particular AV 102 may be automatically updated whenever additional software ecosystem data, environmental conditions data, and/or performance data for the AV 102 is received at IDA computing device 112. The data record may be updated in real-time (e.g., upon receipt of the additional data), semi-real-time, or may be updated periodically. For example, to conserve computational resources, data records may be updated by IDA computing device 112 at prescheduled times such that different data records are scheduled to be updated at different times. This may reduce the computational resources required to update the data records, particular when large amounts of additional software ecosystem data, environmental conditions data, and/or performance data are received at IDA computing device 112 at once (e.g., from manufacturer computing device 130). In some embodiments, each data record includes a time stamp that indicates when that data record was most recently updated. This enables IDA computing device 112 to, among other things, determine how recent the data is for the particular AV 102.

In some embodiments, in addition to the most recently received data for an AV 102, the data records also maintain previously stored data. Accordingly, each data record includes historical data (e.g., previous software ecosystems and a time stamps indicating when the each previous software ecosystem was present on the AV 102) that provides a comprehensive record for the associated AV 102. Further, the historical data may be analyzed by IDA computing device 112. For example, from the historical data, IDA computing device 112 may determine whether particular software applications on AVs 102 are generally updated promptly once an update is available, or whether those software applications are generally updated a substantial period of time after an update is available.

To identify interactions between software ecosystems and environmental conditions, IDA computing device 112 may use one or more algorithms (e.g., clustering algorithms, machine learning algorithms, etc.) to analyze the data stored in the data records for the plurality of AVs 102. The algorithms may be used, for example, for pattern recognition and/or to proactively identify interactions that may result in particular outcomes before those outcomes actually occur.

For example, in some embodiments, IDA computing device 112 applies one or more clustering algorithms to identify a subset of data records for AVs 102 that have identical or similar software ecosystems. Alternatively or additionally, to facilitate detecting interactions and correlations as described below, IDA computing device 112 may apply one or more clustering algorithms to identify a subset of data records for AVs 102 that have similar performance data.

In some embodiments, one or more clustering algorithms may estimate or ascertain similar software ecosystems based on the function of a given software program. That is, the algorithm may assign clusters based on identifying similar input and output data for a given software program even though the developers, versions, and/or names of the given software program may be different.

Further, in some embodiments, the clustering algorithms may identify similar software programs by determining that the one or more software programs call data from the same external API. Although the software programs may function differently, clustering algorithms may cluster the software programs as similar because the software programs use the same data to derive proprietary calculations. Additionally or alternatively, the clustering algorithms may identify similar software programs based on metadata associated with the given software programs. For example, downloaded software programs (e.g., applications from an app store) may contain classifications about the function and/or categories of the software programs (e.g., food ordering, safety, car-sharing programs, video streaming, etc.).

In some embodiments, because the data records stored in database 120 may be updated relatively frequently, IDA computing device 112 may repeatedly apply the one or more clustering algorithms to identify similar data records based upon current data. For example, IDA computing device 112 may periodically apply the one or more clustering algorithms at a predetermined frequency to identify similar data records.

After the clustering algorithm identifies data records for AVs 102 that have similar software ecosystems, IDA computing device 112 may analyze data records in the subset (e.g., using one or more machine learning algorithms) to attempt to identify patterns between software ecosystem data, environmental conditions data, and performance data stored therein. Specifically, from the software ecosystem data in the subset of data records, IDA computing device 112 may detect interactions between a particular software application or combination of software applications, and environmental conditions that may result in certain outcomes (including undesirable or adverse outcomes). That is, by analyzing data records using machine learning, IDA computing device 112 may be configured to detect correlations between software-environment interactions and outcomes. For example, the IDA computing device may determine that a number of AVs having Version 2.1 of Application X were involved in collisions when traversing steep terrain. In exemplary embodiments, correlations detected by IDA computing device 112 may be stored in database 120 for further analysis, as described below. Further, each correlation may be stored in database 120 in association with the data records that were used to detect the correlation.

Because database 120 may be aggregated for a relatively large fleet of vehicles operated over a long period of time, historical information may inform (but not dictate) current evaluations for interactions and correlations. For example, it may have been previously established that environments known to have fog have adverse interactions with software program Gamma. Although a patch was released for this issue, future analyses may prioritize analyzing software programs that function similarly to Gamma in regions and time periods that may include (or have included) fog.

In some embodiments, the clustering algorithms may not perform classifications or clustering of software ecosystems before analysis, and the clustering algorithms may instead assign classifications or clusters based on performance data. For example, the clustering algorithms may first identify and cluster the most similar performance data from the plurality of AVs and then cluster and analyze the clusters of similar performance data for similarities in the software ecosystems. This method may be used alone or in combination with the methods described above. In some embodiments, multiple clustering models may be combined to achieve an accurate outcome.

In exemplary embodiments, IDA computing device 112 may also generate a confidence indicator or other parameter that indicates a strength of the detected correlation between the particular software-environment interaction and the particular outcome. The confidence indicator may generally represent the likelihood that a particular software-environment interaction actually contributes to the particular outcome. The confidence indicator may be, for example, a percentage or a textual description (e.g., unlikely, somewhat likely, very likely). For example, if a large number of AVs 102 that do not have a combination of Application Q and Application P had braking failures in rainy conditions, IDA computing device 112 may generate a confidence indicator of 25% or "unlikely" in regards to whether an interaction between the combination of Application Q and Application P and rainy conditions contributes to braking failure. In contrast, if substantially only AVs 102 that have the combination of Application Q and Application P had braking failures in rainy conditions, IDA computing device 112 may generate a confidence indicator of 75% or "likely" in regards to whether an interaction between the combination of Application Q and Application P and rainy conditions contributes to braking failure.

In exemplary embodiments, IDA computing device 112 may also automatically generate and transmit alert messages based upon the detected correlations. For example, IDA computing device 112 may automatically generate an alert message when confidence indicator for a correlation exceeds a predetermined threshold (e.g., a predetermined percentage). The alert message may include a text alert or a verbal alert spoken by AV 102 to the vehicle operator or passenger (e.g., "Warning: Using Version 2.1 of Application X on steep terrain may result in collisions"), or may include any suitable content. In some embodiments, the alert message may also suggest a remedial action that can be taken to avoid the outcome associated with the detected correlation (e.g., "Please update to Version 3.0 of Application X").

In some embodiments, IDA computing device 112 may transmit the generated alert message to one or more manufacturer computing devices 130. Further, in some embodiments, IDA computing device 112 may transmit the generated alert message to AVs 102 that are at risk. For example, IDA computing device 112 may filter the data records stored in database 120 to identify all data records associated with AVs 102 currently running Version 2.1 of Application X, and transmit the alert message directly to those AVs 102 to notify the operators of those AVs 102. In embodiments where alert messages are transmitted directly to AVs 102, an alert message may also include a patch that causes the AV 102 receiving the alert message to automatically update the onboard software ecosystem (e.g., by updating one or more software applications) to avoid undesirable outcomes. In yet other embodiments, alerts may be transmitted to user devices 134 of users that are associated with AVs 102 that are at risk. These alerts may be transmitted direction to user devices 134 or to user devices 134 through the associated AVs 102.

Exemplary Client Computing Device

Figure 2:
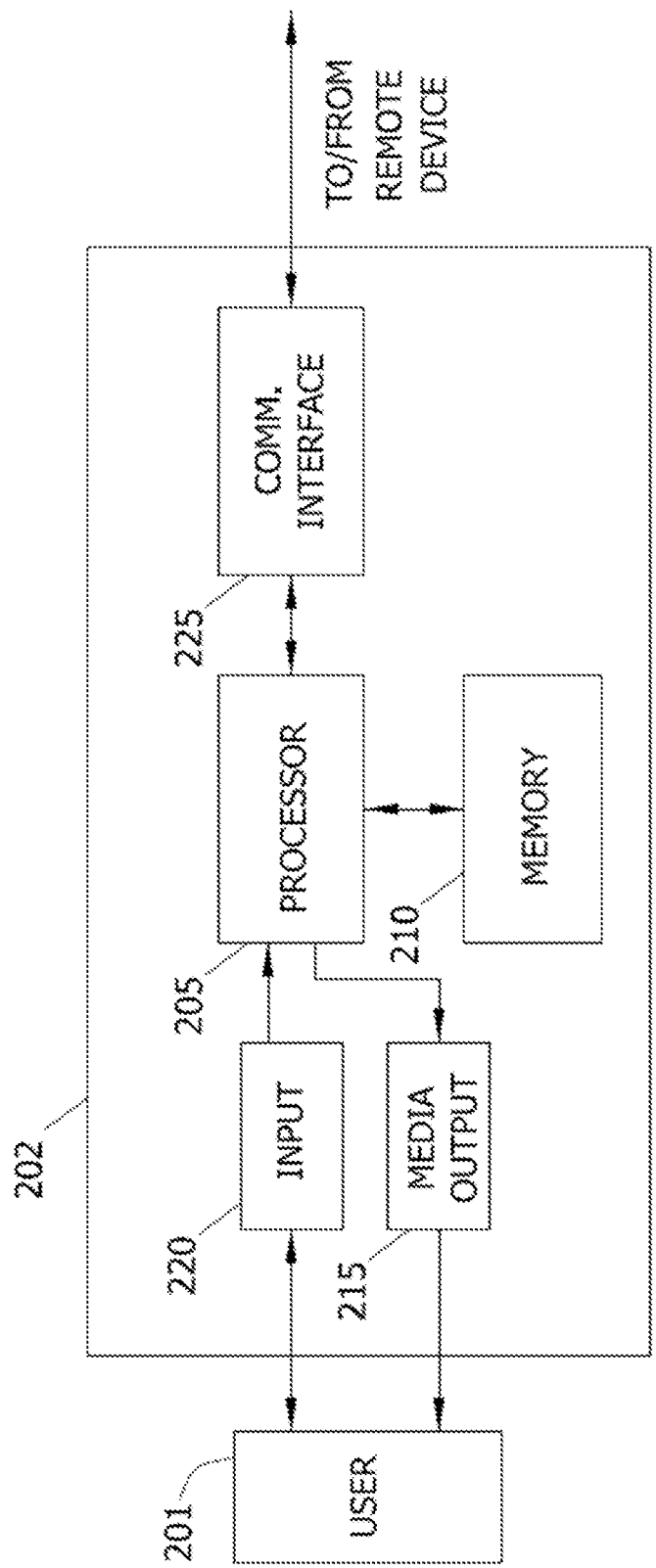
FIG. 2 depicts an exemplary client computing device that may be used with the interaction detection system illustrated in FIG. 1.

FIG. 2 depicts an exemplary client computing device 202. Client computing device 202 may be, for example, at least one of AVs 102, manufacturer computing device 130, third party computing device 132, and user device 134 (all shown in FIG. 1).

Client computing device 202 may include a processor 205 for executing instructions. In some embodiments, executable instructions may be stored in a memory area 210. Processor 205 may include one or more processing units (e.g., in a multi-core configuration). Memory area 210 may be any device allowing information such as executable instructions and/or other data to be stored and retrieved. Memory area 210 may include one or more computer readable media.

In exemplary embodiments, client computing device 202 may also include at least one media output component 215 for presenting information to a user 201. Media output component 215 may be any component capable of conveying information to user 201. In some embodiments, media output component 215 may include an output adapter such as a video adapter and/or an audio adapter. An output adapter may be operatively coupled to processor 205 and operatively couplable to an output device such as a display device (e.g., a liquid crystal display (LCD), light emitting diode (LED) display, organic light emitting diode (OLED) display, cathode ray tube (CRT) display, "electronic ink" display, or a projected display) or an audio output device (e.g., a speaker or headphones).

Client computing device 202 may also include an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Client computing device 202 may also include a communication interface 225, which can be communicatively coupled to a remote device such as IDA computing device 112 (shown in FIG. 1). Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 may be, for example, computer readable instructions for providing a user interface to user 201 via media output component 215 and, optionally, receiving and processing input from input device 220. A user interface may include, among other possibilities, a web browser and client application. Web browsers may enable users, such as user 201, to display and interact with media and other information typically embedded on a web page or a website. A client application may allow user 201 to interact with a server application from IDA computing device 112 (shown in FIG. 1).

Memory area 210 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Server System

Figure 3:
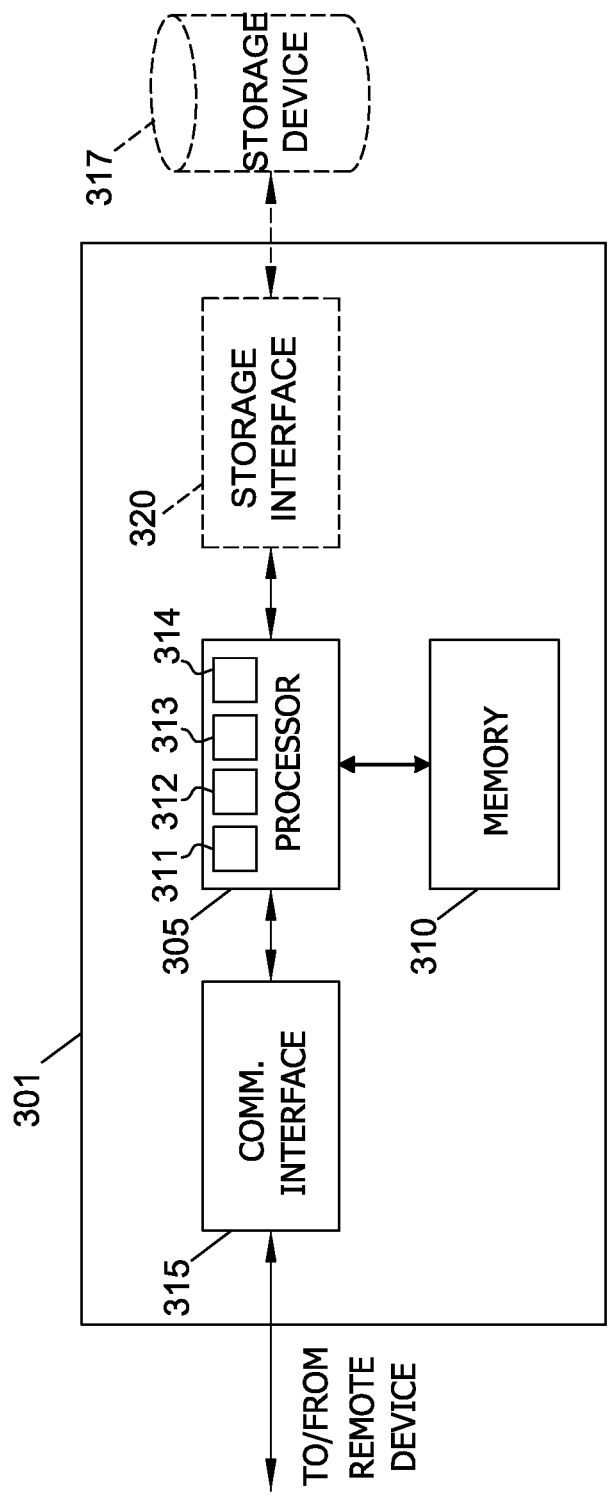
FIG. 3 depicts an exemplary server system that may be used with the interaction detection system illustrated in FIG. 1.

FIG. 3 depicts an exemplary server system 301. Server system 301 may be, for example, IDA computing device 112 (shown in FIG. 1).

In exemplary embodiments, server system 301 may include a processor 305 for executing instructions. Instructions may be stored in a memory area 310. Processor 305 may include one or more processing units (e.g., in a multi-core configuration) for executing instructions. The instructions may be executed within a variety of different operating systems on server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

In exemplary embodiments, processor 305 may include and/or be communicatively coupled to one or more modules for implementing the systems and methods described herein. For example, processor 305 may include a clustering module 311 configured to apply one or more clustering algorithms to identify a subset of data records for AVs 102 that have similar software ecosystems, as described above. Processor 305 may include an analytics module 312 configured to analyze data records in the subset (e.g., using machine learning algorithms) to attempt to identify patterns, as described above. Further, processor 305 may include a confidence indicator module 313 configured to generate confidence indicators, as described above, and may include an alert module 314 configured to generate alert messages, as described above.

Processor 305 may be operatively coupled to a communication interface 315 such that server system 301 is capable of communicating with a remote device such as AVs 102, manufacturer computing device 130, and third party computing device 132 (all shown in FIG. 1), or another server system 301. For example, communication interface 315 may receive requests from user device 134 (shown in FIG. 1) via the Internet.

Processor 305 may also be operatively coupled to a storage device 317, such as database 120 (shown in FIG. 1). Storage device 317 may be any computer-operated hardware suitable for storing and/or retrieving data. In some embodiments, storage device 317 may be integrated in server system 301. For example, server system 301 may include one or more hard disk drives as storage device 317. In other embodiments, storage device 317 may be external to server system 301 and may be accessed by a plurality of server systems 301. For example, storage device 317 may include multiple storage units such as hard disks or solid state disks in a redundant array of inexpensive disks (RAID) configuration. Storage device 317 may include a storage area network (SAN) and/or a network attached storage (NAS) system.

In some embodiments, processor 305 may be operatively coupled to storage device 317 via a storage interface 320. Storage interface 320 may be any component capable of providing processor 305 with access to storage device 317. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 317.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Exemplary Autonomous Vehicle

Figure 4:
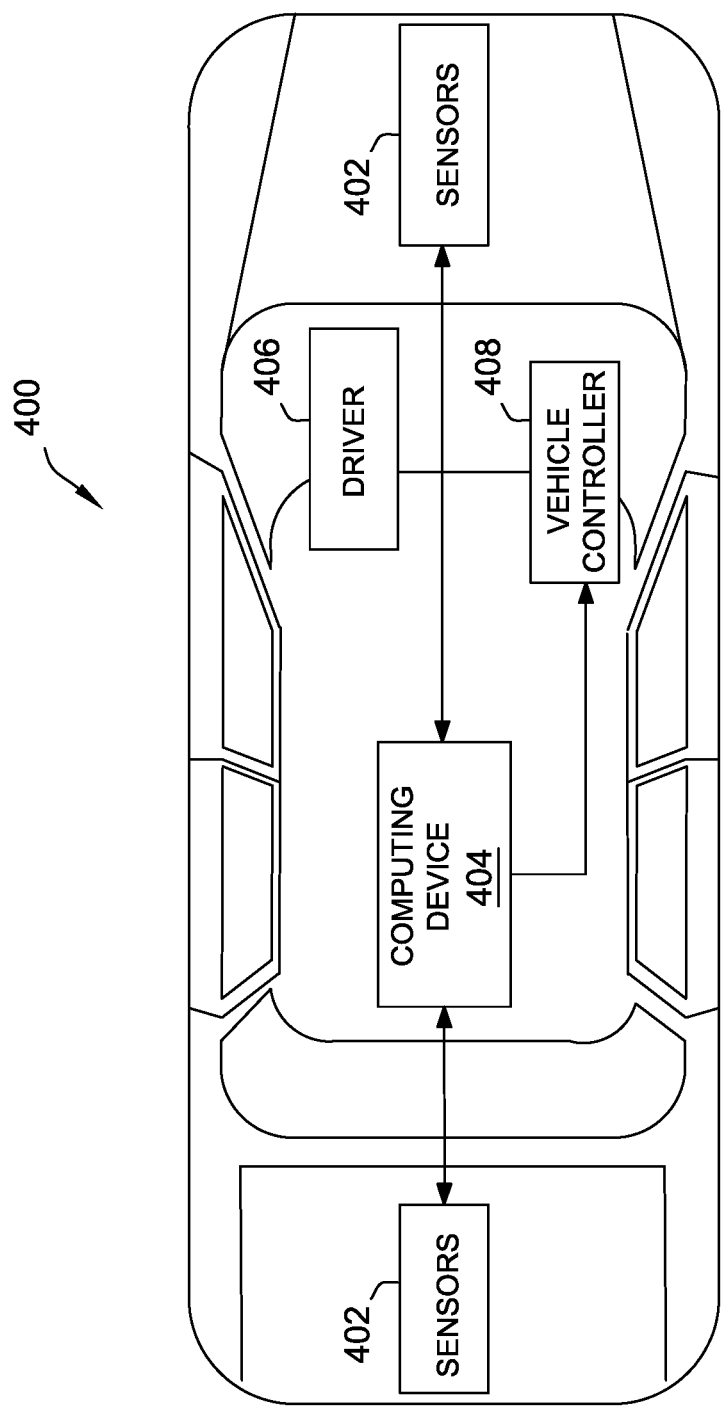
FIG. 4 depicts an exemplary autonomous vehicle that may be used with the interaction detection system illustrated in FIG. 1.

FIG. 4 depicts an exemplary autonomous vehicle (AV) 400. AV 400 may be, for example, AV 102 (shown in FIG. 1). AV 400 may be an autonomous or semi-autonomous vehicle capable of fulfilling the transportation capabilities of a traditional automobile or other vehicle. In these embodiments, AV 400 may be capable of sensing its environment and navigating without human input.

AV 400 may include a plurality of sensors 402, a computing device 404, and a vehicle controller 408. Sensors 402 may be, for example, sensors 136 (shown in FIG. 2). Further, sensors 402 may include, but are not limited to, temperature sensors, terrain sensors, weather sensors, accelerometers, gyroscopes, radar, LIDAR, Global Positioning System (GPS), video devices, imaging devices, cameras (e.g., 2D and 3D cameras), audio recorders, and computer vision. Sensors 402 may be used to collect at least one of software ecosystem data, environmental conditions data, and performance data, as described above.

Computing device 404 may be implemented, for example, as client computing device 202 (shown in FIG. 2). In exemplary embodiments, computing device 404 may receive data from sensors 402 and transmit received data to IDA computing device 112 (not shown in FIG. 4).

In exemplary embodiments, vehicle controller 408 may control operation of AV 400. For example, vehicle controller 408 may steer, accelerate, or decelerate AV 400 based upon data received, for example, from sensors 402. In some embodiments, vehicle controller 408 may include a display screen or touchscreen (not shown) that is capable of displaying an alert to driver 406. The alert may be, for example, an alert generated by IDA computing device 112 and transmitted to AV 400, as described above.

In other embodiments, vehicle controller 408 may be capable of wirelessly communicating with a user device 134 (shown in FIG. 1) such as a mobile device (not shown) in AV 400. In these embodiments, vehicle controller 408 may be capable of communicating with the user of a mobile device, such as driver 406, through an application on the mobile device. In some embodiments, computing device 404 may include vehicle controller 408.

Exemplary Method for Detecting Interactions

Figure 5:
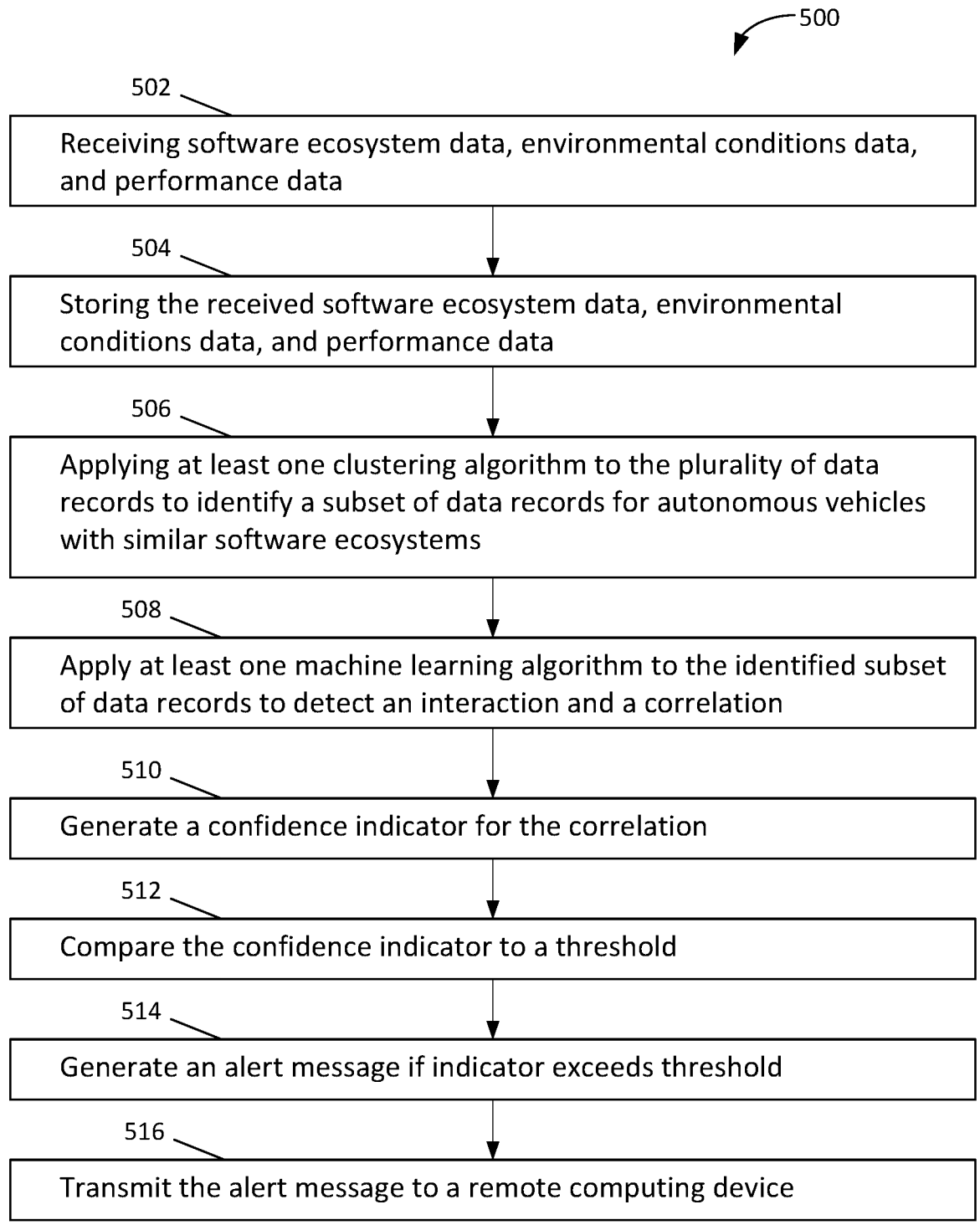
FIG. 5 illustrates an exemplary method that may be performed using the interaction detection system illustrated in FIG. 1.

FIG. 5 depicts an exemplary method 500 that may be performed using an interaction detection system (e.g., interaction detection system 100, shown in FIG. 1) for aggregating and analyzing data from a plurality of AVs to identify undesirable or desirable performance outcomes based upon interactions between software onboard the AVs and environmental conditions experienced by the AVs. In some embodiments, method 500 may be performed using IDA computing device 112 (shown in FIG. 1).

Method 500 may include receiving 502, from a plurality of data sources, software ecosystem data, environmental conditions data, and performance data for a plurality of AVs, such as AVs 102 (shown in FIG. 1). The data source may include at least one of AVs 102, manufacturer computing device 130, third party computing device 132, and user device 134 (all shown in FIG. 1).

Method 500 may further include storing 504 the received software ecosystem data, environmental conditions data, and performance data in a plurality of data records in a database, such as database 120 (shown in FIG. 1). Each data record may be associated with one AV and may store software ecosystem data, environmental conditions data, and performance data for that AV.

Method 500 may further include applying 506 at least one clustering algorithm to the plurality of data records to identify a subset of data records for AVs that have similar software ecosystems, as described above. Further, method 500 may include applying 508 at least one machine learning algorithm to the identified subset of data records to detect i) an interaction between at least one software application and at least one environmental condition that may result in a particular outcome and ii) a correlation between the detected interaction and the particular outcome, as described above.

In some embodiments, method 500 may further include generating 510 a confidence indicator that indicates a strength of the detected correlation. Further, method 500 may include comparing 512 the confidence indicator to a predetermined threshold, automatically generating 514 an alert message when the confidence indicator exceeds the predetermined threshold, and automatically transmitting 516 the alert message to a remote computing device.

Exemplary System for Evaluating Interactions for Proposed Trips

Figure 6:
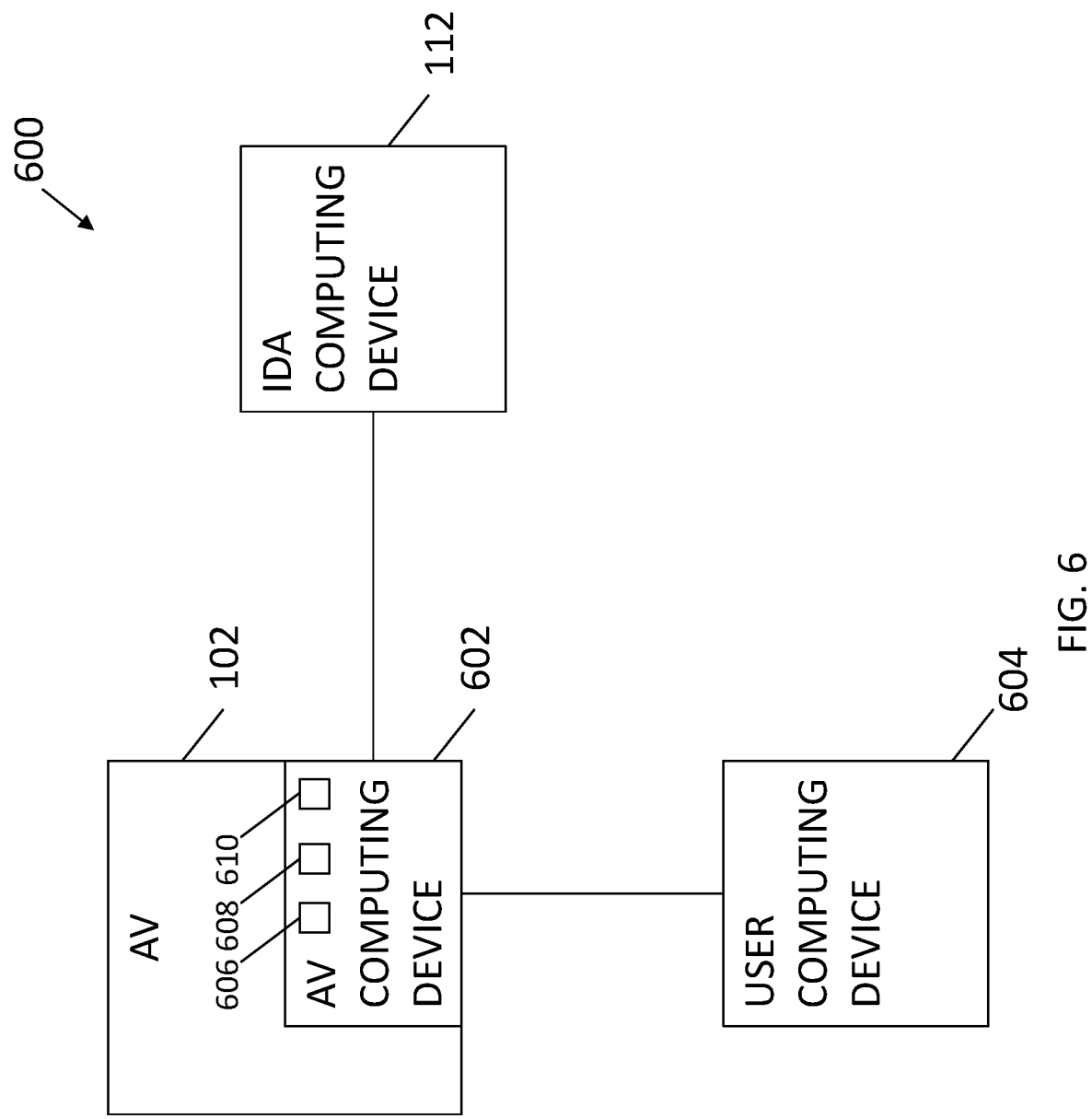
FIG. 6 illustrates an exemplary interaction evaluation system in accordance with an exemplary embodiment of the present disclosure.

FIG. 6 depicts an exemplary interaction evaluation system 600 in accordance with an exemplary embodiment of the present disclosure. In the exemplary embodiment, software evaluation system 600 may include an autonomous vehicle (AV) 102 including an AV computing device 602. In the exemplary embodiment, AV computing device 602 may be communicatively coupled to IDA computing device 112. In some embodiments, AV computing device 602 may be communicatively coupled to a user computing device 604.

In the exemplary embodiments, AV computing device 602 may include and/or be communicatively coupled to one or more modules for implementing the systems and methods described herein. For example, AV computing device 602 may include a communications module 606 configured to receive a proposed trip for AV 102, determine environmental conditions for the trip based on a destination location and a departure time, retrieve current software ecosystem data for AV 102, and retrieve aggregated data for a plurality of AVs. AV computing device may further include a comparing module 608 configured to compare the environmental conditions data for the proposed trip and the current software ecosystem data for the AV to a plurality of correlations included in the aggregated data to identify an adverse performance outcome. AV computing device 602 may further include an executing module 610 configured to execute a remedial action to avoid the identified adverse performance outcome.

In one embodiment, AV computing device 602 may be a computer including a web browser, such that IDA computing device 112 may be accessible to AV computing device 602 using the Internet. AV computing device 602 may be interconnected to the Internet through many interfaces including a network, such as a local area network (LAN) or a wide area network (WAN), dial-in-connections, cable modems, and special high-speed Integrated Services Digital Network (ISDN) lines. AV computing device 602 may be any device capable of interconnecting to the Internet.

In the exemplary embodiment, AV computing device 602 evaluates the interactions between a software ecosystem for AV 102 and environmental conditions that will likely be encountered by AV 102 during a proposed trip having a designated destination location and departure time. AV computing device 602 may receive a destination location and departure time to determine potential environmental conditions that correspond to one or more routes to the destination location.

To identify the destination location and departure time of a proposed trip, AV computing device 602 may receive input directly from the user (e.g., by entering an address on a touchscreen). Alternatively, AV computing device 602 may predict potential destination locations and departure times, for example, by analyzing data associated with the user.

To predict a potential destination location and departure time, AV computing device 602 may analyze user data. AV computing device 602 may obtain user data from, for example, an electronic calendar, emails, saved internet searches, purchase transaction data, and/or internet browsing data associated with the user. Such user data may be obtained by AV computing device 602 from data stored on AV 102 (e.g., data stored by software applications installed on the AV). Alternatively, AV computing device 602 may obtain user data by receiving data from user computing device 604 (e.g., a mobile phone device or PDA), or the Internet. AV computing device 602 may then compare the user data to data known to correspond with a particular potential destination location, to determine the likelihood that the user is planning a trip to the potential destination location at the potential departure time (e.g., 50% of users with similar user data travel to destination X at time Y). If the determined likelihood is sufficiently high (e.g., above a predefined threshold percentage), AV computing device 602 may automatically evaluate interactions between the software ecosystems onboard AV 102 and potential environmental conditions with respect to a proposed trip to the predicted destination location at the predicted departure time.

In the exemplary embodiment, AV computing device 602 determines potential environmental conditions data specific for a proposed trip to the identified destination location at the identified departure time. AV computing device 602 may obtain information about potential environmental conditions from, for example, the Internet. The environmental conditions data may correspond to a particular route and the departure time (e.g., day or night, a season, weather-related data, a specific date and time, etc.). AV computing device 602 may select the route based in part on the potential environmental conditions that are associated with different potential routes. These potential environmental conditions may include, for example, current and forecasted weather conditions along the route, terrain along the route, construction along the route, and events along the route that may cause an increase in traffic (e.g., a sporting event, concert, or festival). The potential environmental conditions may further include local events (e.g., road closures due to a parade), local regulations (e.g., speed limits), and compliance trends associated with the local regulations (e.g., a tendency for pedestrians to jaywalk in a certain location or during a certain event). Once a particular route to the identified destination location is selected, potential environmental conditions data associated with the particular selected route at the departure time (e.g., current or forecasted weather, traffic, construction, or events along the selected route) is considered when evaluating interactions between the software ecosystem of AV 102 and environmental conditions.

In the exemplary embodiment, AV computing device 602 retrieves current software ecosystem data including software applications currently onboard AV 102. For example, software ecosystem data for AV 102 may include all software applications currently installed on AV 102, as well as the current version of each software application. Further, software ecosystem data for AV 102 may include an update history for the software applications that indicates when each software application was updated. In some embodiments, AV 102 may include automatic update functionality that, when activated, causes software applications onboard AV 102 to be automatically updated whenever newer versions and/or patches become available. In such embodiments, the software ecosystem data may also indicate whether the AV 102 has automatic update functionality, and whether the automatic update functionality is currently activated.

In the exemplary embodiment AV computing device 602 retrieves aggregated data related to a plurality of AV's software ecosystem and environmental conditions. Such data may include, for example, software ecosystem data, environmental conditions data, and performance data from a plurality of AVs. The aggregated data may further include a plurality of correlations. Each correlation may include i) an interaction between at least one software application and at least one environmental condition and ii) an adverse performance outcome associated with the interaction. The adverse performance outcome may be deemed likely to occur for an AV with the associated interaction (e.g., a percentage of AVs with a particular interaction having an adverse performance outcome is above a threshold percentage) to warrant remedial action. The generation of aggregated data may be performed by IDA computing device 112 in communication with AV computing device 602.

In some embodiments, AV computing device 602 retrieves data records stored in a database by IDA computing device 112. The data records may include, for example, aggregated software ecosystem data, environmental conditions data, and performance data. AV computing device 602 may compare the software ecosystem for AV 102 to data records stored in the database to retrieve data records that include software ecosystems data that are relatively similar to the software ecosystem for AV 102. AV computing device 602 may then receive the retrieved data records stored in the database by IDA computing device 112.

In the exemplary embodiment, AV computing device 602 compares the software ecosystem data for AV 102 and the environmental conditions data likely to be experienced by AV 102 to the plurality of correlations included in the aggregated data. AV computing device 602 may identify an adverse performance outcome associated with an interaction between a software application and/or combination of software applications currently onboard AV 102 and an environmental condition likely to be experienced by AV 102 on the proposed trip. For example, AV computing device 602 may determine that an interaction for the AV is sufficiently similar to an interaction corresponding to a correlation from the aggregated data to determine that the corresponding adverse performance outcome is likely to occur.

AV computing device 602 may calculate a risk score for AV 102 for the proposed trip based on any identified correlations. For example, if no associated correlations are identified for the retrieved data records, AV computing device 602 may calculate a risk score that indicates AV 102 has a low risk of experiencing an undesirable or adverse outcome on the proposed trip. In contrast, if a number of correlations are identified for the retrieved data records and/or correlations associated with certain outcomes (e.g., collisions) are identified for the retrieved data records, AV computing device 602 may calculate a risk score that indicates AV 102 has a high risk of experiencing an undesirable or adverse outcome on the proposed trip.

In the exemplary embodiment, in response to the comparison of interactions or a received risk score, AV computing device 602 executes remedial action to avoid identified adverse performance outcomes. AV computing device 602 may recommend remedies or remedial steps to the user or automatically implements such remedies for AV 102.

For example, AV computing device 602 may display alert messages to the user based on the comparison or risk score. For example, if the risk score for an interaction exceeds a predetermined threshold of acceptable risk, AV computing device 602 may display an alert message. The alert message may include text (e.g., "Warning: Using Version 2.1 of Application X on steep terrain may result in collisions"), or may include any suitable content. Based on the risk score, AV computing device 602 may suggest a remedial action (e.g., "Please update to Version 3.0 of Application X").

In some embodiments, AV computing device 602 may automatically update the onboard software ecosystem (e.g., by updating one or more software applications) to avoid adverse performance outcomes. AV computing device 602 may download a patch that causes AV 102 to automatically update the onboard software ecosystem to minimize the number of interactions correlated with adverse performance outcomes (e.g., automatically updating Application X to Version 3.0 if currently installed Version 2.1 is correlated with adverse outcomes for the proposed trip).

Exemplary Method for Evaluating Software Issues for Proposed Trips

Figure 7A:
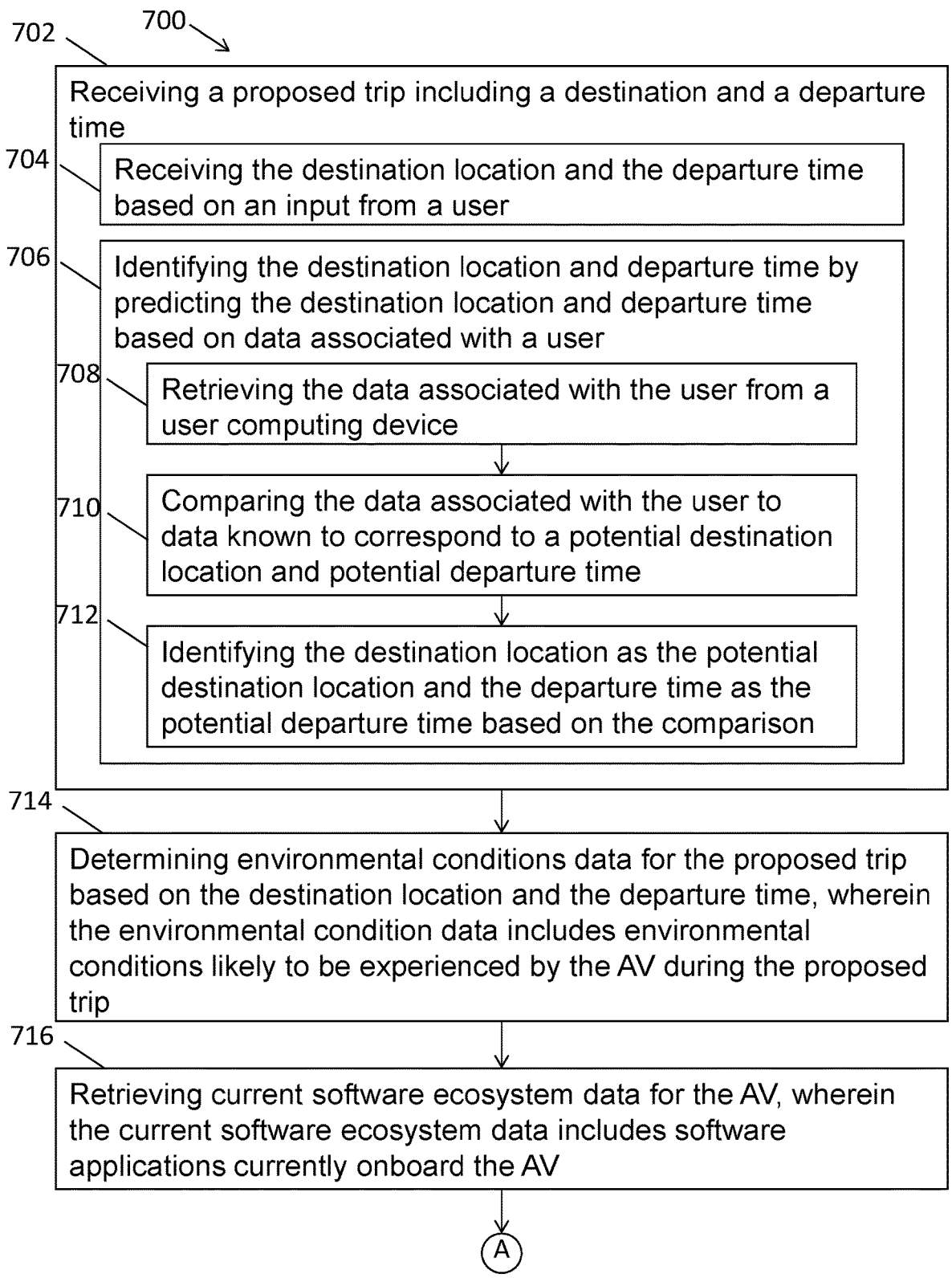
FIG. 7A illustrates an exemplary method that may be performed using the interaction evaluation system illustrated in FIG. 6.
Figure 7B:
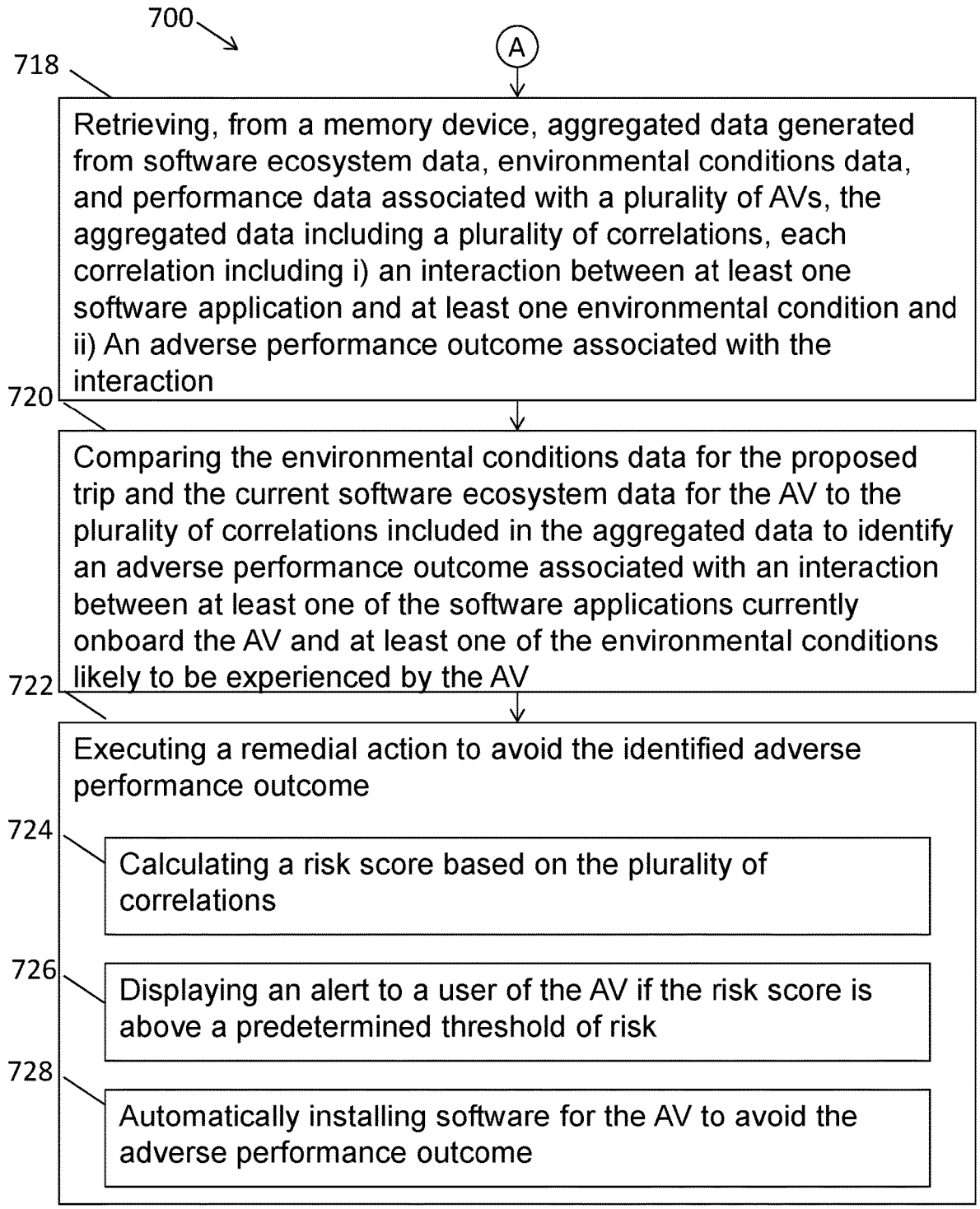
FIG. 7B is a continuation of the exemplary method illustrated in FIG. 6A.

FIGS. 7A and 7B depict an exemplary method 700 that may be performed using a software evaluation system (e.g., interaction evaluation system 600, shown in FIG. 6) for evaluating software issues due to interactions between software onboard the AVs and environmental conditions experienced by the AVs for a proposed trip. In some embodiments, method 700 may be performed by AV computing device 602 (shown in FIG. 5).

Method 700 may include receiving 702 a proposed trip for an AV including a destination location and a departure time. In some embodiments, method 700 further includes receiving 704 the destination location and the departure time based on an input from a user. In certain embodiments, method 700 may additionally or alternatively include receiving 706, by the AV computing device, the destination location and the departure time by predicting the destination location and the departure time based on data associated with a user. In such certain embodiments, method 700 may further include retrieving 708, by the AV computing device, the data associated with the user from a user computing device, comparing 710, by the AV computing device, the data associated with the user to data known to correspond to a potential destination location and potential departure time, and identifying 712, by the AV computing device, the destination location as the potential destination location and the departure time as the potential departure time based on the comparison.

Method 700 may further include determining 714 environmental conditions data for the proposed trip based on the destination location and the departure time, wherein the environmental conditions data includes environmental conditions likely to be experienced by the AV during the proposed trip.

Method 700 may further include retrieving 716 current software ecosystem data for the AV, wherein the current software ecosystem data includes software applications currently onboard the AV.

Method 700 may further include retrieving 718, from a memory device, aggregated data for a plurality of AVs including software ecosystem data, environmental conditions data, and performance data associated with the a plurality of AVs, the aggregated data further including a plurality of correlations, each correlation including i) an interaction between at least one software application and at least one environmental condition and ii) an adverse performance outcome associated with the interaction;

Method 700 may further include comparing 720 the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV.

Method 700 may further include executing 722 a remedial action to avoid the identified adverse performance outcome. In certain embodiments, method 700 may further include calculating 724 a risk score based on the plurality of correlations. In such certain embodiments, method 700 may further include displaying 726 an alert to a user of the AV if the risk score is above a predetermined threshold of risk. In some embodiments, method 700 may further include automatically installing 728 software for the AV to eliminate the interaction associated with the adverse performance outcome.

Exemplary Embodiments & Functionality

In one aspect, an autonomous vehicle (AV) computing device onboard an AV and including at least one processor may be provided. The at least processor may be programmed to (i) receive a proposed trip for the AV including a destination location and a departure time, (ii) determine environmental conditions data for the proposed trip based on the destination location and the departure time, wherein the environmental conditions data includes environmental conditions likely to be experienced by the AV during the proposed trip, (iii) retrieve current software ecosystem data for the AV, wherein the current software ecosystem data includes software applications currently onboard the AV, (iv) retrieve, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) compare the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) execute a remedial action to avoid the identified adverse performance outcome.

One enhancement may be where the processor is further programmed to calculate a risk score based on the plurality of correlations.

Another enhancement may be where the processor is further programmed to display an alert to a user of the AV if the risk score is above a predetermined threshold of risk.

Another enhancement may be where to execute the remedial action the processor is further programmed to automatically install software for the AV to avoid the adverse performance outcome.

Another enhancement may be where the software ecosystem data includes all software applications currently installed on the AV and a current version of each installed software application.

Another enhancement may be where the environmental conditions data includes at least one of weather conditions, terrain, traffic conditions, local events, local regulations, and compliance trends associated with the local regulations along a route to the retrieved destination.

Another enhancement may be where to receive the proposed trip, the processor is programmed to receive the destination location and the departure time based on an input from a user.

Another enhancement may be where to receive the proposed trip, processor is programmed to identify the destination location and departure time by predicting the destination location and departure time based on data associated with a user.

Another enhancement may be where to receive the proposed trip, the processor is programed to i) retrieve the data associated with the user from a user computing device, ii) compare the data associated with the user to data known to correspond to a potential destination location and potential departure time, and iii) identify the destination as the potential destination and the departure time as the potential departure time based on the comparison.

In another aspect, a computer-implemented method may be provided. The computer-implemented method may include (i) receiving, by an autonomous vehicle (AV) computing device, a proposed trip for the AV including a destination location and a departure time, (ii) determining, by the AV computing device, environmental conditions data for the proposed trip based on the destination location and the departure time, wherein the environmental conditions data includes environmental conditions likely to be experienced by the AV during the proposed trip, (iii) retrieving, by the AV computing device, current software ecosystem data for the AV, wherein the current software ecosystem data includes software applications currently onboard the AV, (iv) retrieving, by the AV computing device, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) comparing, by the AV computing device, the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) executing, by the AV computing device, a remedial action to avoid the identified adverse performance outcome.

In a further aspect, at least one non-transitory computer-readable media having computer-executable instructions thereon may be provided. When the instructions are executed by at least one processor of an autonomous vehicle (AV) computing device onboard an AV, the instructions may cause the at least one processor of the AV computing device to (i) receive a proposed trip for the AV including a destination location and a departure time, (ii) determine environmental conditions data for the proposed trip based on the destination location and the departure time, wherein the environmental conditions data includes environmental conditions likely to be experienced by the AV during the proposed trip, (iii) retrieve current software ecosystem data for the AV, wherein the current software ecosystem data includes software applications currently onboard the AV, (iv) retrieve, from a memory device, aggregated data for a plurality of AVs including software ecosystem data, environmental conditions data, and performance data associated with the a plurality of AVs, the aggregated data further including a plurality of correlations, each correlation including a) an interaction between at least one software application and at least one environmental condition and b) an adverse performance outcome associated with the interaction, (v) compare the environmental conditions data for the proposed trip and the current software ecosystem data for the AV to the plurality of correlations included in the aggregated data to identify an adverse performance outcome associated with an interaction between at least one of the software applications currently onboard the AV and at least one of the environmental conditions likely to be experienced by the AV, and (vi) execute a remedial action to avoid the identified adverse performance outcome.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or proces sor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing device associated with a vehicle and comprising at least one processor configured to:
   retrieve environmental conditions data for the vehicle, the environmental conditions data including environmental conditions likely to be experienced by the vehicle;
   retrieve current software ecosystem data for the vehicle, the current software ecosystem data including software applications currently onboard the vehicle;
   retrieve, from a memory device, aggregated data for a plurality of vehicles including software ecosystem data and environmental conditions data associated with the plurality of vehicles, the aggregated data further including a plurality of correlations relating to the aggregated data;
   identify an adverse performance outcome associated with an interaction between at least one of the software applications currently onboard the vehicle and at least one of the environmental conditions likely to be experienced by the vehicle by comparing the environmental conditions data for the vehicle and the current software ecosystem data to the plurality of correlations; and
   cause an alert message to be displayed on a display device within the vehicle.

2. The computing device of claim 1, wherein the at least one processor is further configured to receive a proposed trip for the vehicle including a destination location and a departure time.

3. The computing device of claim 2, wherein the at least one processor is further configured to retrieve a set of environmental conditions data for the proposed trip based on the destination location and the departure time, the set of environmental conditions data including trip environmental conditions likely to be experienced by the vehicle during the proposed trip.

4. The computing device of claim 1, wherein the aggregated data for the plurality of vehicles further includes performance data associated with the plurality of vehicles.

5. The computing device of claim 1, wherein the alert message includes a remedial action to avoid the adverse performance outcome, and wherein the at least one processor is further configured to execute the remedial action.

6. The computing device of claim 1, wherein the vehicle is one of an autonomous vehicle and a semi-autonomous vehicle.

7. The computing device of claim 1, wherein the at least one processor is further configured to automatically update the software applications currently onboard the vehicle to avoid the adverse performance outcome.

8. A computer-implemented method comprising:
   retrieving environmental conditions data for a vehicle, the environmental conditions data including environmental conditions likely to be experienced by the vehicle;
   retrieving current software ecosystem data for the vehicle, the current software ecosystem data including software applications currently onboard the vehicle;
   retrieving, from a memory device, aggregated data for a plurality of vehicles including software ecosystem data and environmental conditions data associated with the plurality of vehicles, the aggregated data further including a plurality of correlations relating to the aggregated data;
   identifying an adverse performance outcome associated with an interaction between at least one of the software applications currently onboard the vehicle and at least one of the environmental conditions likely to be experienced by the vehicle by comparing the environmental conditions data for the vehicle and the current software ecosystem data to the plurality of correlations; and
   causing an alert message to be displayed on a display device within the vehicle.

9. The computer-implemented method of claim 8 further comprising receiving a proposed trip for the vehicle including a destination location and a departure time.

10. The computer-implemented method of claim 9 further comprising retrieving a set of environmental conditions data for the proposed trip based on the destination location and the departure time, the set of environmental conditions data including trip environmental conditions likely to be experienced by the vehicle during the proposed trip.

11. The computer-implemented method of claim 8, wherein the aggregated data for the plurality of vehicles further includes performance data associated with the plurality of vehicles.

12. The computer-implemented method of claim 8, wherein the alert message includes a remedial action to avoid the adverse performance outcome, and wherein the method further comprises executing the remedial action.

13. The computer-implemented method of claim 8, wherein the vehicle is one of an autonomous vehicle and a semi-autonomous vehicle.

14. The computer-implemented method of claim 8 further comprising automatically updating the software applications currently onboard the vehicle to avoid the adverse performance outcome.

15. A non-transitory computer-readable storage medium having computer-executable instructions thereon, wherein when executed by at least one processor of a computing device associated with a vehicle, cause the at least one processor to:
- retrieve environmental conditions data for the vehicle, the environmental conditions data including environmental conditions likely to be experienced by the vehicle;
- retrieve current software ecosystem data for the vehicle, the current software ecosystem data including software applications currently onboard the vehicle;
- retrieve, from a memory device, aggregated data for a plurality of vehicles including software ecosystem data and environmental conditions data associated with the plurality of vehicles, the aggregated data further including a plurality of correlations relating to the aggregated data;
- identify an adverse performance outcome associated with an interaction between at least one of the software applications currently onboard the vehicle and at least one of the environmental conditions likely to be experienced by the vehicle by comparing the environmental conditions data for the vehicle and the current software ecosystem data to the plurality of correlations; and
- cause an alert message to be displayed on a display device within the vehicle.

16. The non-transitory computer-readable storage medium of claim 15, wherein the computer-executable instructions further cause the at least one processor to receive a proposed trip for the vehicle including a destination location and a departure time.

17. The non-transitory computer-readable storage medium of claim 16, wherein the computer-executable instructions further cause the at least one processor to retrieve a set of environmental conditions data for the proposed trip based on the destination location and the departure time, the set of environmental conditions data including trip environmental conditions likely to be experienced by the vehicle during the proposed trip.

18. The non-transitory computer-readable storage medium of claim 15, wherein the aggregated data for the plurality of vehicles further includes performance data associated with the plurality of vehicles.

19. The non-transitory computer-readable storage medium of claim 15, wherein the alert message includes a remedial action to avoid the adverse performance outcome, and wherein the computer-executable instructions further cause the at least one processor to execute the remedial action.

20. The non-transitory computer-readable storage medium of claim 15, wherein the computer-executable instructions further cause the at least one processor to automatically update the software applications currently onboard the vehicle to avoid the adverse performance outcome.

* * * * *